United States Patent
Otsuka

(10) Patent No.: US 11,307,821 B2
(45) Date of Patent: Apr. 19, 2022

(54) PRINT CONTROL METHOD, NON-TRANSITORY RECORDING MEDIUM, INFORMATION PROCESSING APPARATUS, AND PRINTING SYSTEM FOR PULL PRINTING

(71) Applicant: Minari Otsuka, Kanagawa (JP)

(72) Inventor: Minari Otsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/851,240

(22) Filed: Apr. 17, 2020

(65) Prior Publication Data

US 2020/0364006 A1    Nov. 19, 2020

(30) Foreign Application Priority Data

May 15, 2019    (JP) .............................. JP2019-092198

(51) Int. Cl.
*G06F 3/12*    (2006.01)

(52) U.S. Cl.
CPC ............ *G06F 3/126* (2013.01); *G06F 3/1204* (2013.01); *G06F 3/1267* (2013.01); *G06F 3/1274* (2013.01)

(58) Field of Classification Search
None
See application file for complete search history.

(56) References Cited

U.S. PATENT DOCUMENTS

| | | | | |
|---|---|---|---|---|
| 7,233,403 | B2* | 6/2007 | Nakagiri | G06F 3/1205 358/1.1 |
| 8,115,940 | B2* | 2/2012 | Utsunomiya | G03G 15/5087 358/1.13 |
| 8,699,063 | B2* | 4/2014 | Takagi | G06F 3/1208 358/1.15 |
| 8,873,090 | B2* | 10/2014 | Nakagawa | G06F 3/1268 358/1.15 |
| 9,098,220 | B2* | 8/2015 | Kikuchi | G06F 3/1267 |
| 10,740,048 | B2* | 8/2020 | Taylor | G06F 9/4411 |
| 2005/0206916 | A1 | 9/2005 | Nakagiri et al. | |
| 2012/0140278 | A1* | 6/2012 | Sousa | G06F 3/1256 358/1.15 |
| 2018/0210686 | A1 | 7/2018 | Takigawa et al. | |
| 2019/0114126 | A1 | 4/2019 | Suzuki | |

FOREIGN PATENT DOCUMENTS

| | | |
|---|---|---|
| JP | 2012-245695 | 12/2012 |
| JP | 2018-120334 | 8/2018 |

OTHER PUBLICATIONS

Extended European Search Report for EP20169895.8 dated Oct. 7, 2020.

* cited by examiner

*Primary Examiner* — Paul F Payer
(74) *Attorney, Agent, or Firm* — IPUSA, PLLC

(57) ABSTRACT

A print control method, a non-transitory recording medium, an information processing apparatus and a printing system. The print control method includes acquiring a print job to be executed by the image forming apparatus, storing print data relating to the print job in a memory, receiving an operation for displaying a job list of print job, creating the job list of print job corresponding to the print data stored in the memory when the operation is received, and displaying the job list of print job on a display.

13 Claims, 36 Drawing Sheets

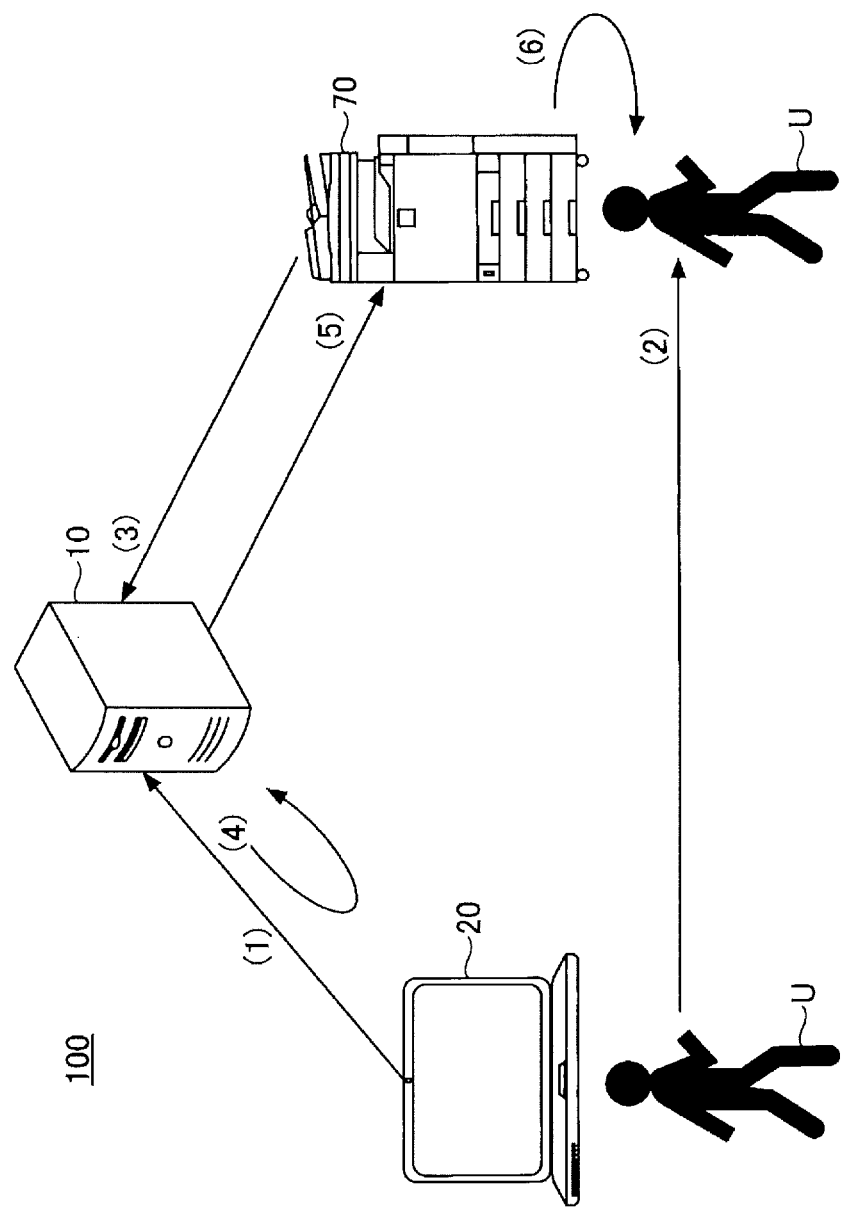

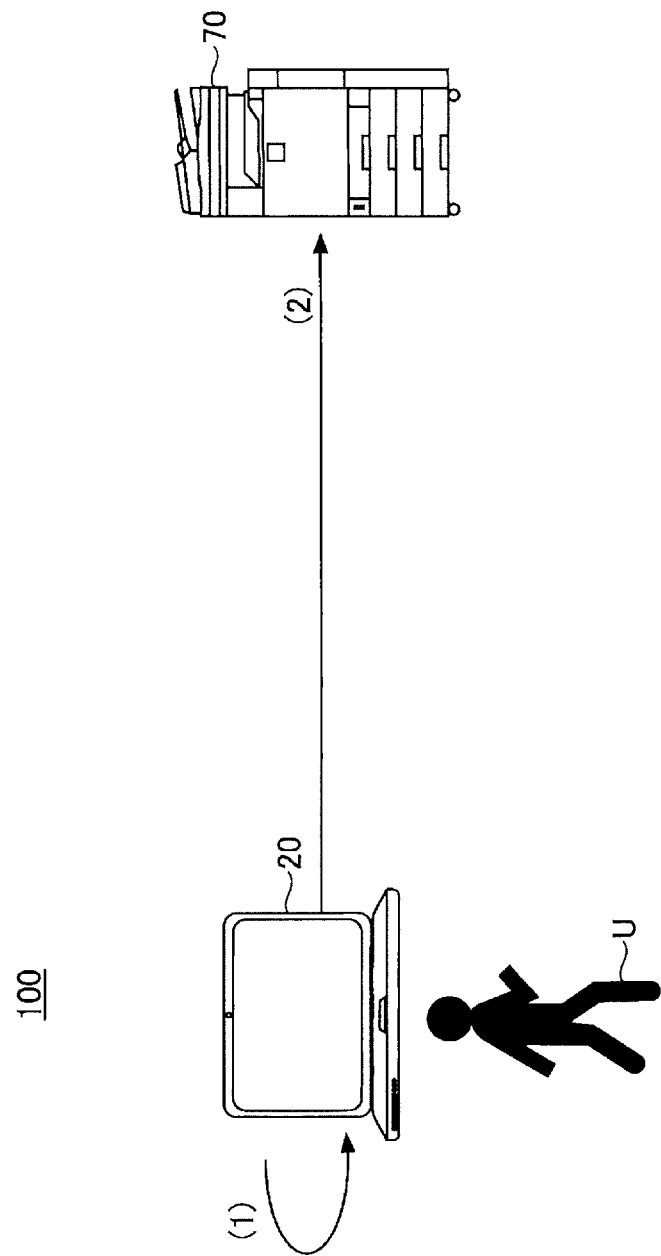

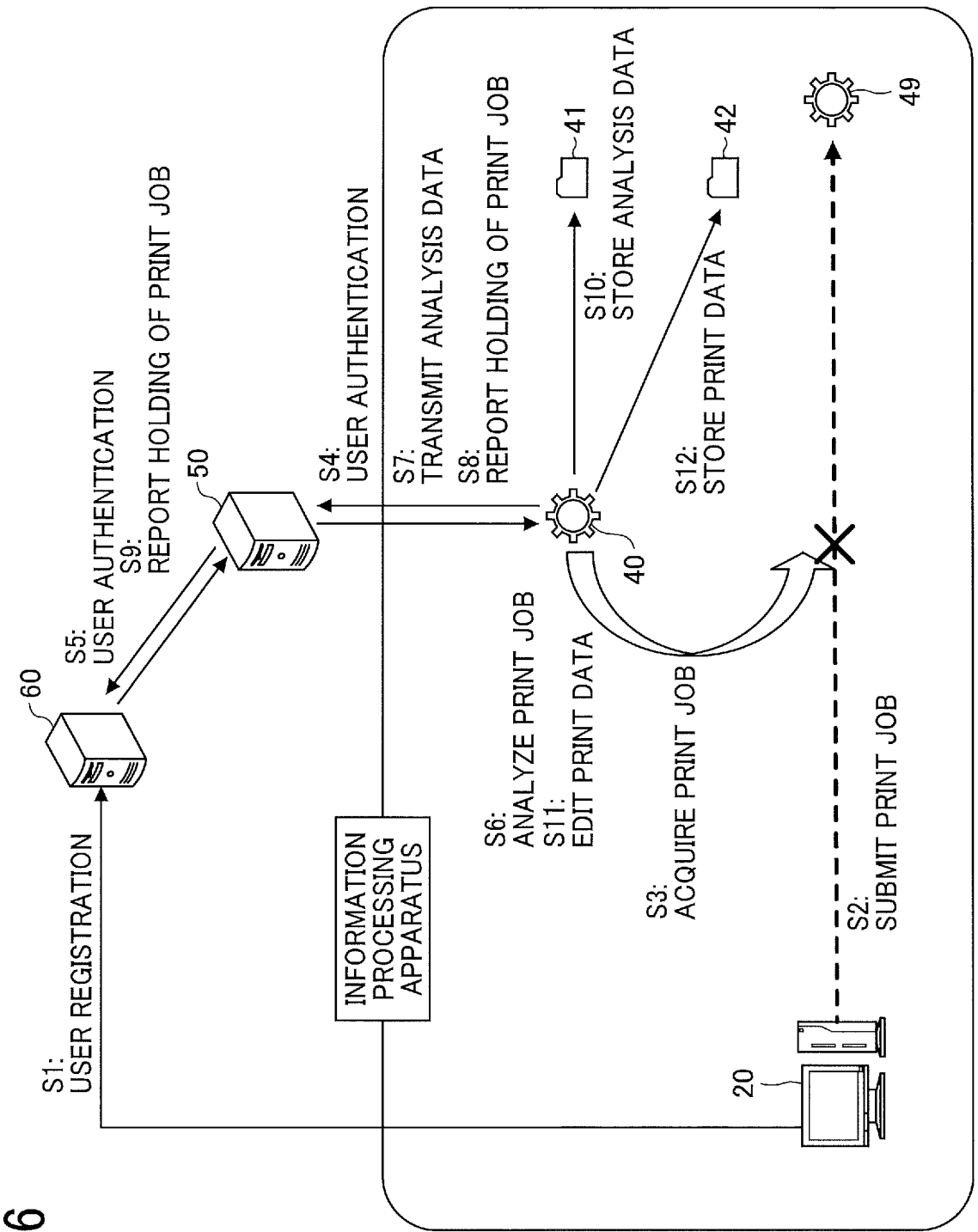

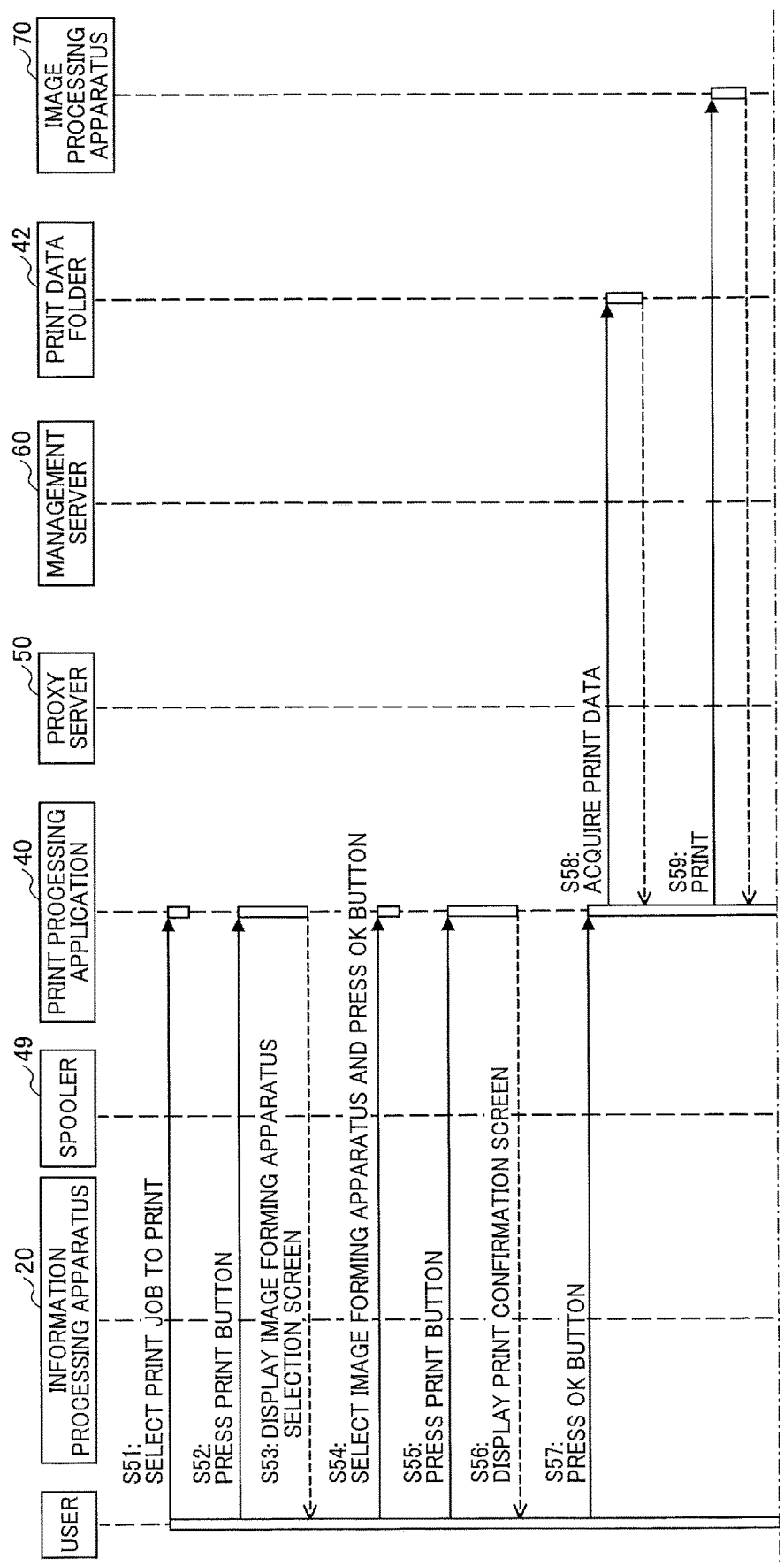

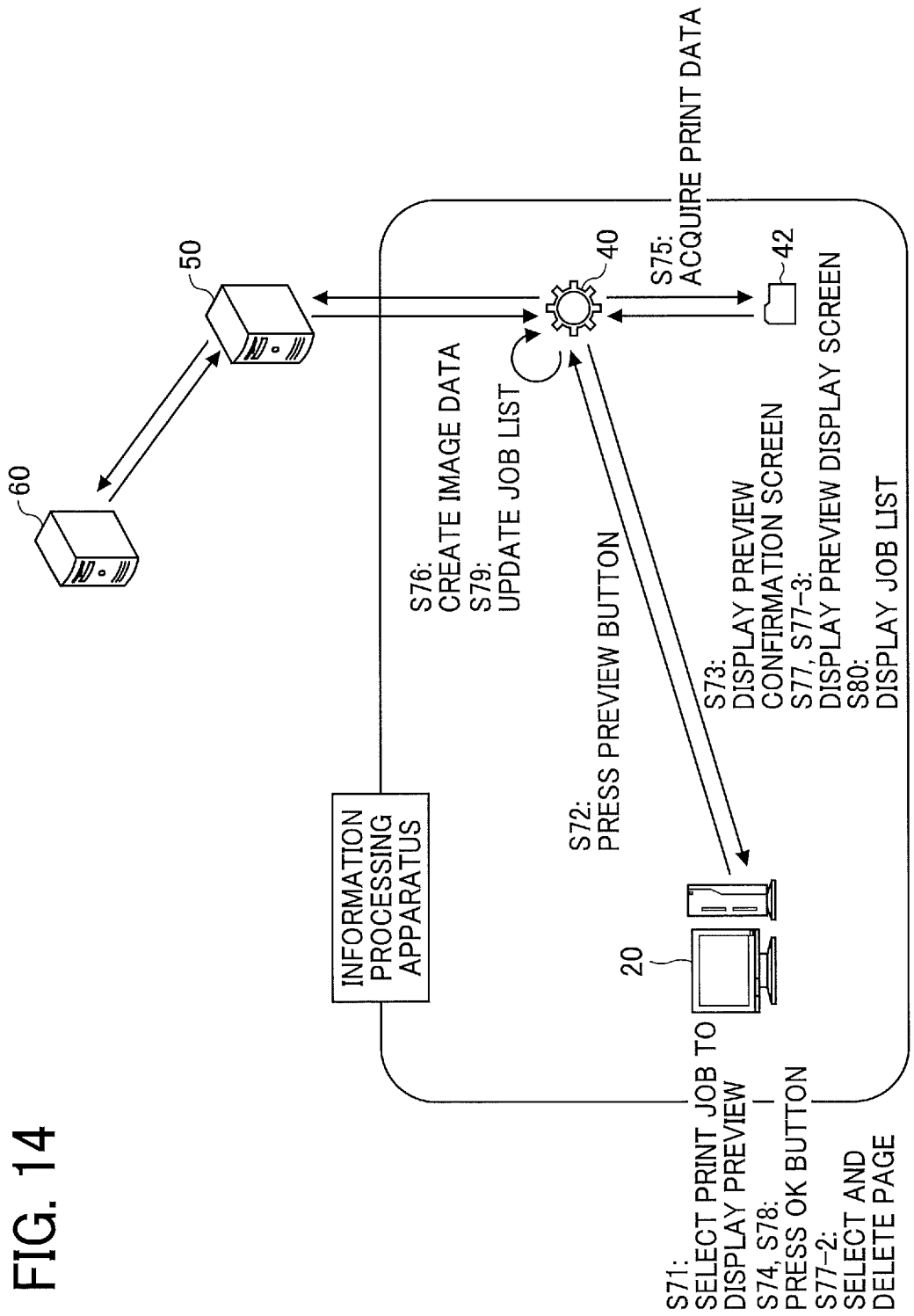

FIG. 19A

| Job List | | | | | | |
|---|---|---|---|---|---|---|
| User: user | | | | | | |
| Document | No. of Pages | Date | Size | Quantity | Simplex/ Duplex | Color/ Monochrome |
| test page_1 | 2 | 19/1/1 | 500 | 7 | Simplex | Monochrome |
| test page_2 | 6 | 19/1/1 | 1500 | 2 | Duplex | Monochrome |
| test page_3 | 10 | 19/1/2 | 2500 | 1 | Simplex | Color |
| test page_4 | 4 | 19/1/2 | 1000 | 5 | Duplex | Monochrome |
| test page_5 | 28 | 19/1/3 | 7000 | 1 | Duplex | Color |

Print  Delete  Preview  OK

FIG. 19B

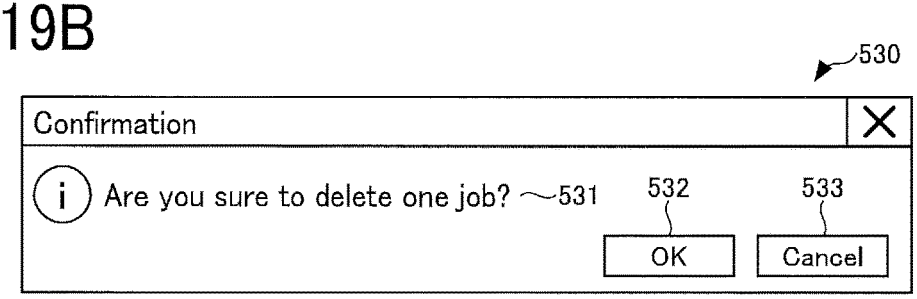

Confirmation (i) Are you sure to delete one job? ~531    OK   Cancel

FIG. 19C

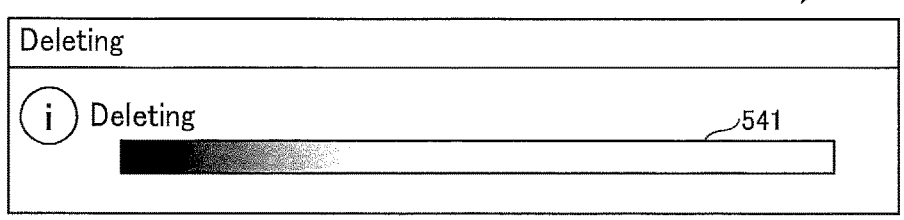

Deleting (i) Deleting

FIG. 19D

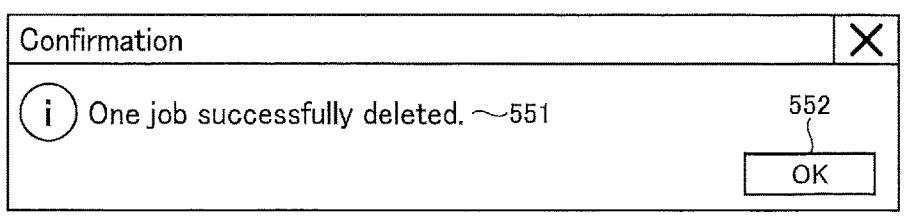

Confirmation (i) One job successfully deleted. ~551    OK

FIG. 20

| Job List | | | | | | | — □ × |
|---|---|---|---|---|---|---|---|
| User: user | | | | | | | |
| Document | No. of Pages | Date | Size | Quantity | Simplex/ Duplex | Color/ Monochrome | |
| test page_1 | 2 | 19/1/1 | 500 | 7 | Simplex | Monochrome | |
| test page_2 | 6 | 19/1/1 | 1500 | 2 | Duplex | Monochrome | |
| test page_4 | 4 | 19/1/2 | 1000 | 5 | Duplex | Monochrome | |
| test page_5 | 28 | 19/1/3 | 7000 | 1 | Duplex | Color | |
| 501 | 502 | 503 | 504 508 | 505 509 | 506 510 | 511 | 507 |
| | | | Print | Delete | Preview | OK | |

FIG. 21A

| Job List | | | | | | — □ × |
|---|---|---|---|---|---|---|
| User: user | | | | | | |
| Document | No. of Pages | Date | Size | Quantity | Simplex/ Duplex | Color/ Monochrome |
| test page_1 | 2 | 19/1/1 | 500 | 7 | Simplex | Monochrome |
| test page_2 | 6 | 19/1/1 | 1500 | 2 | Duplex | Monochrome |
| test page_3 | 10 | 19/1/2 | 2500 | 1 | Simplex | Color |
| test page_4 | 4 | 19/1/2 | 1000 | 5 | Duplex | Monochrome |
| test page_5 | 28 | 19/1/3 | 7000 | 1 | Duplex | Color |

501  502  503  504  505  506  507
508  509  510  511

[ Print ] [ Delete ] [ Preview ] [ OK ]

Selection ×

Select image forming apparatus to print out. 561

| Printer A |
| Printer B |
| Printer C |
| Printer D |

562—[ OK ]  [ Edit ]  [ Print ]
              563      564

Confirmation ×

(i) Are you sure to print out one job? —571   572  573

[ OK ]  [ Cancel ]

FIG. 22A
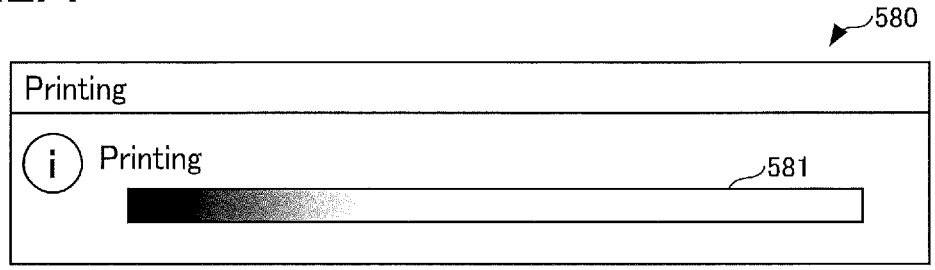
FIG. 22B
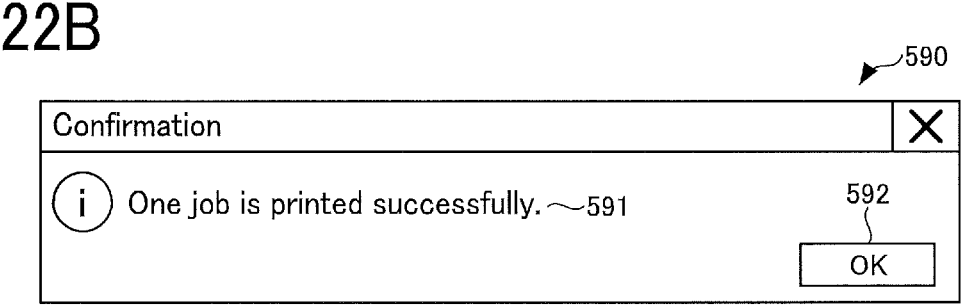
FIG. 22C

FIG. 23A

```
Job List                                                    — ▢ ✕
User: user
```

| Document | No. of Pages | Date | Size | Quantity | Simplex/ Duplex | Color/ Monochrome |
|---|---|---|---|---|---|---|
| test page_1 | 2 | 19/1/1 | 500 | 7 | Simplex | Monochrome |
| test page_2 | 6 | 19/1/1 | 1500 | 2 | Duplex | Monochrome |
| test page_3 | 10 | 19/1/2 | 2500 | 1 | Simplex | Color |
| test page_4 | 4 | 19/1/2 | 1000 | 5 | Duplex | Monochrome |
| test page_5 | 28 | 19/1/3 | 7000 | 1 | Duplex | Color |

501  502  503  504  505  506  507
508  509  510  511

[ Print ] [ Delete ] [ Preview ] [ OK ]

Confirmation                                                  ✕

(i) Are you sure to preview one job? — 601      602   603
                                              [ OK ] [ Cancel ]

Preview                                                       ✕

Preview

611

617

◁ [2] /10 ▷   [ OK ] [ Print ] [ Print Settings ] [ Delete ]
612 614 613    615    616      631              632

FIG. 24

| Job List | | | | | | | — ☐ ✕ |
|---|---|---|---|---|---|---|---|
| User: user | | | | | | | |
| Document | No. of Pages | Date | Size | Quantity | Simplex/ Duplex | Color/ Monochrome | |
| test page_1 | 2 | 19/1/1 | 500 | 7 | Simplex | Monochrome | |
| test page_2 | 6 | 19/1/1 | 1500 | 2 | Duplex | Monochrome | |
| test page_3 | 10 | 19/1/2 | 2500 | 1 | Simplex | Color | |
| test page_4 | 4 | 19/1/2 | 1000 | 5 | Duplex | Monochrome | |
| test page_5 | 28 | 19/1/3 | 7000 | 1 | Duplex | Color | |
| 501 | 502 | 503 | 504 | 505 | 506 | 507 | |
| | | | 508 | 509 | 510 | 511 | |
| | | | | Print | Delete | Preview | OK |

| Job List | | | | | | | — □ × |
|---|---|---|---|---|---|---|---|
| User: user | | | | | | | |
| Document | No. of Pages | Date | Size | Quantity | Simplex/ Duplex | Color/ Monochrome | |
| test page_1 | 2 | 19/1/1 | 500 | 7 | Simplex | Monochrome | |
| test page_2 | 6 | 19/1/1 | 1500 | 2 | Duplex | Monochrome | |
| test page_4 | 4 | 19/1/2 | 1000 | 5 | Duplex | Monochrome | |
| test page_5 | 28 | 19/1/3 | 7000 | 1 | Duplex | Color | |
| 501 | 502 | 503 | 504 | 505 | 506 | 507 | |
| | | | 508 | 509 | 510 | 511 | |
| | | | Print | Delete | Preview | OK | |

500

FIG. 28A
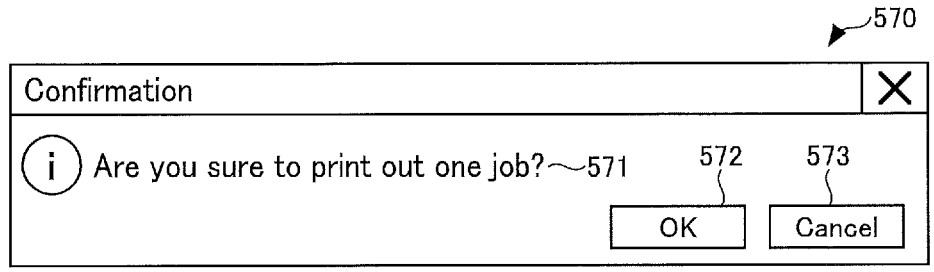
FIG. 28B
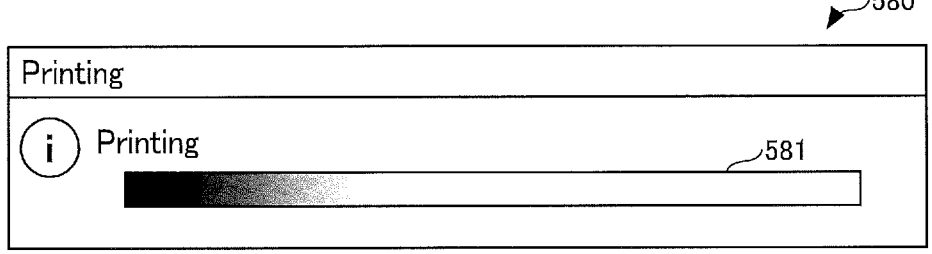
FIG. 28C
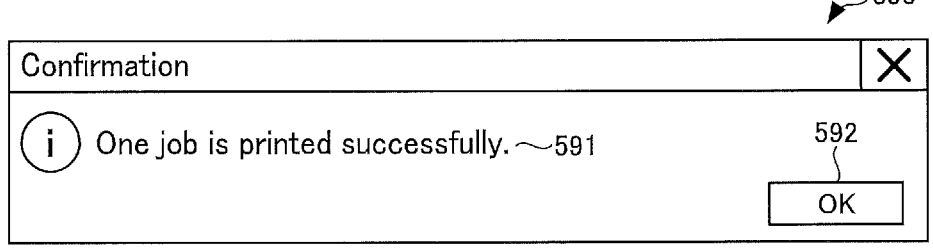
FIG. 28D FIG. 30A
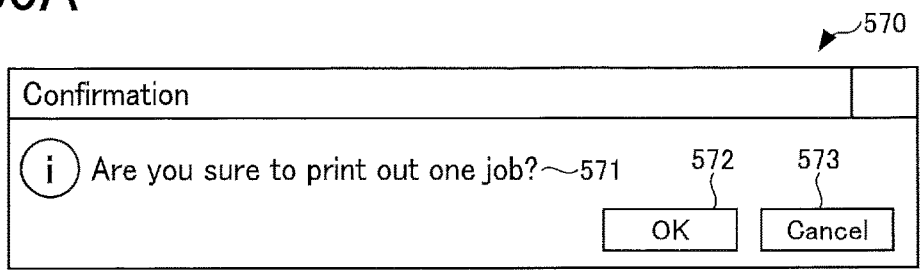
FIG. 30B
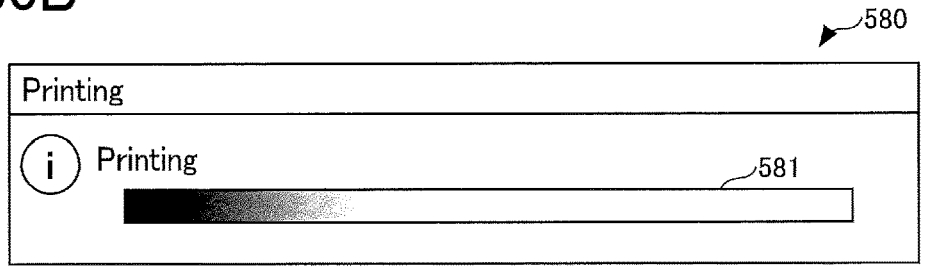
FIG. 30C
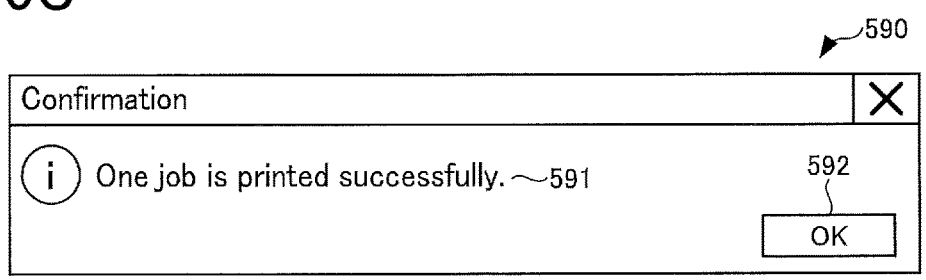
FIG. 30D

PRINT CONTROL METHOD, NON-TRANSITORY RECORDING MEDIUM, INFORMATION PROCESSING APPARATUS, AND PRINTING SYSTEM FOR PULL PRINTING

CROSS-REFERENCE TO RELATED APPLICATIONS

This patent application is based on and claims priority pursuant to 35 U.S.C. § 119(a) to Japanese Patent Application No. 2019-092198, filed on May 15, 2019 in the Japan Patent Office, the entire disclosure of which is hereby incorporated by reference herein.

BACKGROUND

Technical Field

The present disclosure relates to a print control method, a non-transitory recording medium, an information processing apparatus and a printing system.

Background Art

An information processing system that can execute printing by a printing method called pull printing has been known. Pull printing is a method in which a user operates an information processing apparatus or the like to temporarily save a print job in a print server, and then operates the image forming apparatus to acquire (pull) the print job from the print server and print the print job.

Serverless pull printing is another method of pull printing in which a print job is stored in an information processing apparatus operated by a user. By using the pull printing, the user can execute a print job when the user is near the image forming apparatus, and possible security risk due to leaving the printed material unattended can be prevented.

SUMMARY

Embodiments of the present disclosure describe a print control method, a non-transitory recording medium, an information processing apparatus and a printing system. The print control method includes acquiring a print job to be executed by the image forming apparatus, storing print data relating to the print job in a memory, receiving an operation for displaying a job list of print job, creating the job list of print job corresponding to the print data stored in the memory when the operation is received, and displaying the job list of print job on a display.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 1A and FIG. 1B are diagrams illustrating an outline of an operation of a printing system;

FIG. 6 is a schematic diagram illustrating an operation of a print processing application when a print job is accumulated;

FIG. 13A and FIG. 13B are a sequence diagram illustrating an example of a procedure in which the print processing application prints a print job;

FIG. 14 is a schematic diagram illustrating an operation of the print processing application displaying a preview of print data;

FIGS. 19A to 19D are diagrams illustrating an example of screen transition displayed when a delete button is pressed on a print job display screen;

FIG. 20 is a diagram illustrating an example of screen transition displayed when the delete button is pressed on the print job display screen;

FIGS. 21A to 21C are diagrams illustrating an example of screen transition displayed when a print button is pressed on the print job display screen;

FIGS. 22A to 22C are diagrams illustrating an example of screen transition displayed when the print button is pressed on the print job display screen;

FIGS. 23A to 23C are diagrams illustrating an example of screen transition displayed when a preview button is pressed on the print job display screen;

FIG. 24 is a diagram illustrating an example of screen transition displayed when the preview button is pressed on the print job display screen;

FIG. 26 is a diagram illustrating an example of screen transition when the print button is pressed on the preview display screen;

FIGS. 28A to 28D are diagrams illustrating an example of screen transition when a page is designated, and the print button is pressed on the preview display screen;

FIGS. 30A to 30D are diagrams illustrating an example of screen transition when the edit button is pressed on the image forming apparatus selection screen;

Figure 2:
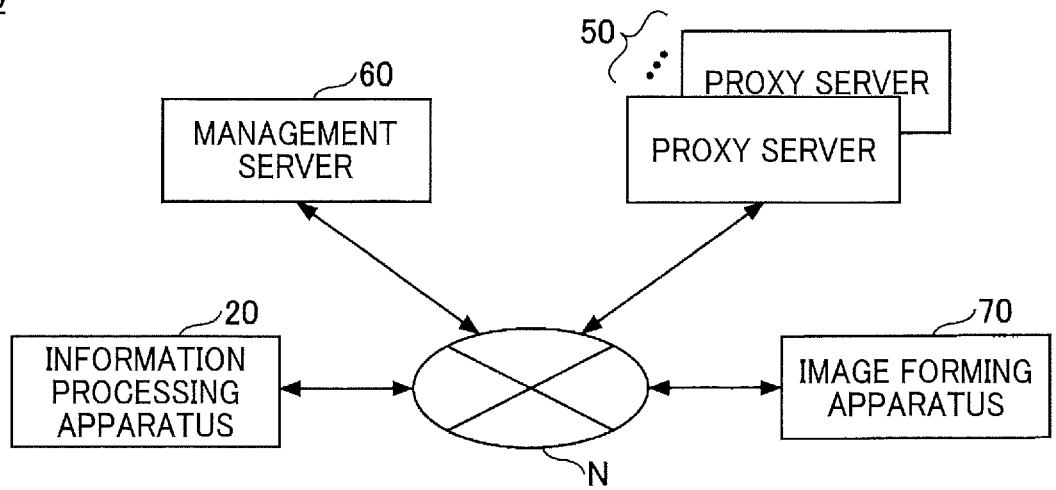
FIG. 2 is a diagram illustrating an example schematic configuration of the printing system.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, a description is given of several embodiments of the present disclosure with reference to the drawings.

FIG. 1A and FIG. 1B are diagrams illustrating an outline of an operation of a printing system 100 according to the present embodiment. First, a comparative example of pull printing is described with reference to FIG. 1A to outline the operation of the printing system of the present embodiment.

(1) The user U operates the information processing apparatus 20 to store a print job in the information processing apparatus 20. In response, the information processing apparatus 20 notifies the print server 10 that the print job is held. The print server 10 associates the user U, the information processing apparatus 20, and the print job.

(2) When printing a print job, the user U moves to the image forming apparatus 70.

(3) When the user U logs in from the operation panel of the image forming apparatus 70, a user identifier (ID) and the like are transmitted to the print server 10.

(4) The print server 10 acquires a job list of print job from the information processing apparatus 20 identified by the user ID.

(5) The print server 10 transmits the job list of print job to the image forming apparatus 70. When the user U selects a print job on the operation panel of the image forming apparatus 70, the identification information of the print job is transmitted to the print server 10, and the print server 10 acquires the print job from the information processing apparatus 20. The print job is transmitted to the image forming apparatus 70, and the image forming apparatus 70 can print the print job.

As described above, when the user performs the pull printing by the serverless pull printing method, the user U needs to operate the operation panel of the image forming apparatus 70.

Next, an outline of a printing method of the printing system 100 according to the present embodiment is described with reference to FIG. 1B.

(1) The user U operates the information processing apparatus 20 to store a print job in the information processing apparatus 20.

When the user U prints the print job, the user U operates the information processing apparatus 20, whereby the information processing apparatus 20 acquires the print job stored in the own apparatus. Work (display, deletion, printing, etc.) relating to the print job can be executed on the information processing apparatus 20.

(2) The print job selected by the user U at the information processing apparatus 20 is transmitted to the image forming apparatus 70, and the image forming apparatus 70 prints the print job.

As described above, since the user U can operate the information processing apparatus 20 to execute the work related to the print job stored in the information processing apparatus 20, the user needs not to move to the image forming apparatus 70. Since the print data is held in the information processing apparatus 20 that has submitted the print job, by changing the print settings described in Page Description Language (PDL), settings such as duplex or simplex, color or monochrome, quantity (number of prints) can be changed, and any page can be deleted. Further, by using the image data in the print data, a preview can be displayed before printing is performed.

A print job refers to a group of data requested to be executed by a print service function and provided for printing and includes print settings on how to print and print data to be printed.

The printer driver is software that allows a user to use the printer easily by connecting the computer and the printer. The printer driver has a function of displaying a user interface screen for accepting print settings and a function of generating print data described in PDL.

An example of the system configuration is described with reference to FIG. 2. FIG. 2 is a diagram illustrating an example schematic configuration of the printing system 100. In the printing system 100, an information processing apparatus 20, one or more image forming apparatuses 70, a management server 60, and one or more proxy servers 50 are connected through a network N. The management server 60 and the proxy server 50 may exist on the cloud or on-premises. The network N may be a general network such as an in-house local area network (LAN) or the internet.

The management server 60 is a server apparatus (information processing apparatus, computer) that collectively manages information of each image forming apparatus 70. The management server 60 has a function as a web server that displays a screen on a browser of the information processing apparatus 20. The management server 60 is mainly in charge of information management and performs only minimal processing. Specific processing is performed by the proxy server 50. The management server 60 stores user information about the user and settings information of each image forming apparatus 70. The settings information is, for example, an internet protocol (IP) address of a server to which the image forming apparatus 70 may connect. If an administrator sets the settings information of the image forming apparatus 70 in the management server 60, the settings information can be reflected on the proxy server 50, and the proxy server 50 can set the image forming apparatus 70. For this reason, the image forming apparatus 70 of the present embodiment only needs to communicate with the proxy server 50 and performs only minimal communication with the management server 60.

The proxy server 50 is a server apparatus (information processing apparatus, computer) that performs a process that may place a heavy load on the image forming apparatus 70. The proxy processing includes, for example, authentication, scan distribution, processing relating to a print server, and the like. Note that the proxy server 50 communicates with the management server 60 and can synchronize information held by the management server 60, thereby reducing communication between the proxy server 50 and the management server 60.

The two types of servers, the management server 60 and the proxy server 50, are merely examples, and only the management server 60 may exist, or the management server 60 and the proxy server 50 may exist as one server.

The image forming apparatus 70 is an apparatus that prints an image on a sheet material such as paper. The image forming apparatus 70 may be called a printer or a printing device. Further, the image forming apparatus 70 may be a multifunction peripheral. The multifunction peripheral refers to an apparatus having a plurality of functions such as a scan function, a print function, a copy function, and a facsimile transmission/reception function. The multifunction peripheral may be called a multi-function printer/product/peripheral (MFP), scan print copy (SPC), or all in one (AIO). In the present embodiment, the image forming apparatus 70 is not required to have the plurality of functions, and only needs to have a function of forming an image.

In the information processing apparatus 20, application programs such as a web browser and word processing software for creating a document file, and a print processing application operate. The information processing apparatus 20 receives a user's print settings with the printer driver or the like called from an application program, and the printer driver submits a print job. Since the printer driver supports serverless pull printing, the printer driver sends out a print job to a print processing application. The print processing application is software for performing processing related to the serverless pull printing.

The information processing apparatus 20 may be, for example, a tablet device, a smartphone, a personal digital assistant (PDA), a wearable personal computer (PC), or the like, in addition to a PC. Further, any device that generates a print job may be used. For example, an image handwritten on an electronic whiteboard may be printed by the image forming apparatus 70. As described above, the information processing apparatus 20 is not limited to a general-purpose information processing apparatus as long as the application program and the print processing application operate.

Figure 3:
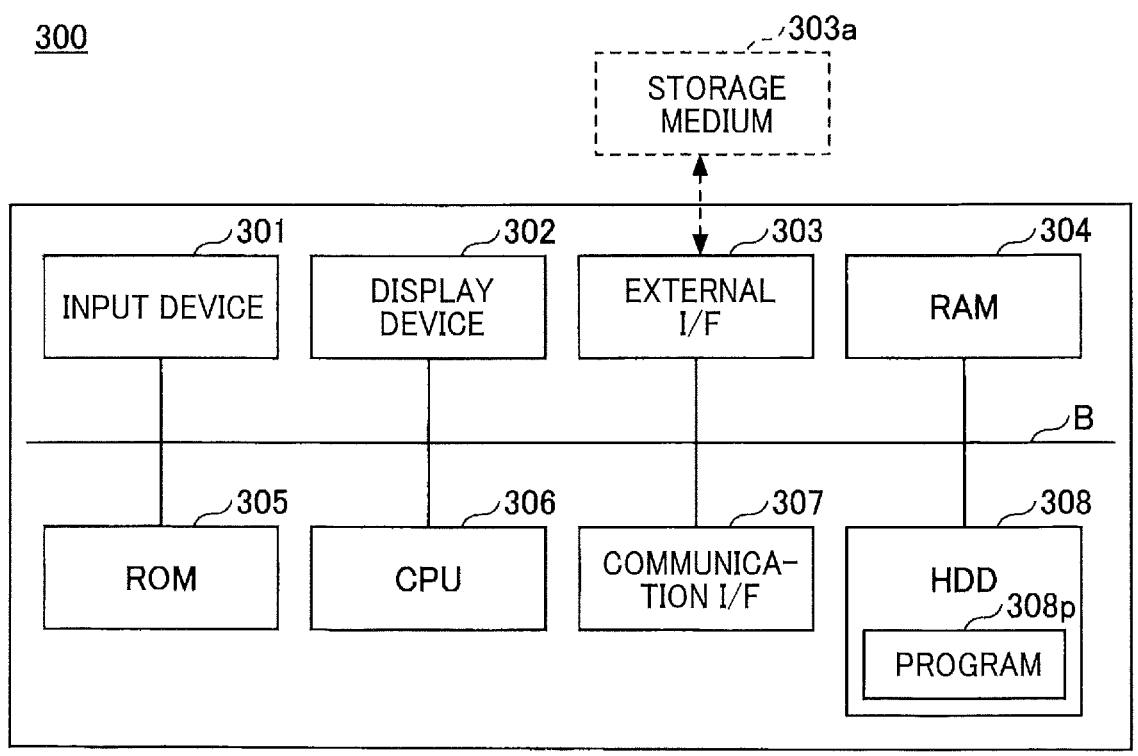
FIG. 3 is a diagram illustrating a hardware configuration of an example of a computer system.

The management server 60, the proxy server 50, and the information processing apparatus 20 are implemented by, for example, a computer system having a hardware configuration illustrated in FIG. 3. FIG. 3 is a block diagram illustrating an example hardware configuration of a computer system 300 according to the present embodiment.

The computer system 300 illustrated in FIG. 3 includes an input device 301, a display device 302, an external interface (IIF) 303, a random access memory (RAM) 304, a read only memory (ROM) 305, a central processing unit (CPU) 306, a communication I/F 307, a hard disk drive (HDD) 308, and the like connected to each other through a bus B.

The input device 301 includes a keyboard, a mouse, a touch panel, and the like, and is used by a user to input each operation signal. The display device 302 includes a display or the like and displays a processing result by the computer system 300. Regarding the management server 60 and the proxy server 50, the input device 301 and the display device 302 may be connected as needed and need not always be connected.

The communication I/F 307 is an interface for connecting the computer system 300 to the in-house network, the internet, or the like. Thereby, the computer system 300 can perform data communication through the communication I/F 307.

The HDD 308 is a non-volatile storage device that stores programs 308$p$ and data. The stored programs and data include, for example, an operating system (OS), which is basic software for controlling the entire computer system 300, and application software for providing various functions on the OS. The HDD 308 manages stored programs and data by a file system and/or a database (DB).

The external I/F 303 is an interface with an external device. The external device includes a storage medium 303$a$ and the like. Thereby, the computer system 300 can read and/or write on the storage medium 303$a$ through the external I/F 303. The storage medium 303$a$ includes a flexible disk, a compact disk (CD), a digital versatile disk (DVD), a Secure Digital (SD) memory card, a universal serial bus (USB) memory, and the like.

The ROM 305 is a nonvolatile semiconductor memory (storage device) that can retain programs and data even when the power is turned off. The ROM 305 stores programs and data such as a basic input/output system (BIOS), OS settings, and network settings that are executed when the computer system 300 is started. The RAM 304 is a volatile semiconductor memory (storage device) that temporarily stores programs and data.

The CPU 306 loads programs or data from a storage device such as the ROM 305 and the HDD 308 onto the RAM 304 and executes processes to implement entire control of the computer system 300 or functions of the computer system 300.

Note that the management server 60 and the proxy server 50 may support cloud computing. Cloud computing refers to a usage mode in which resources on a network are used without being conscious of specific hardware resources.

Figure 4:
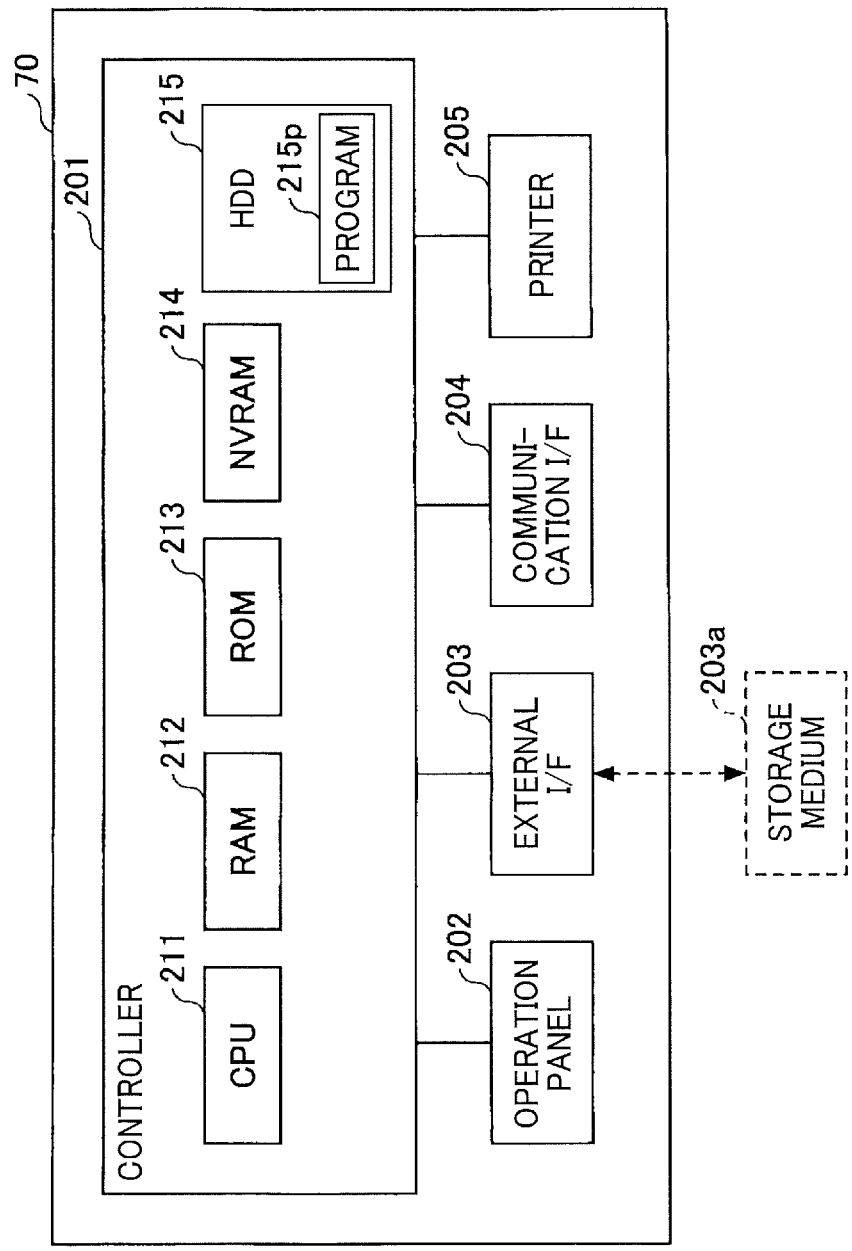
FIG. 4 is a diagram illustrating a hardware configuration of an example of an image forming apparatus.

The image forming apparatus 70 according to the present embodiment is implemented by a hardware configuration as illustrated in FIG. 4, for example. FIG. 4 is a hardware configuration diagram of an example of an image forming apparatus 70 according to the present embodiment. The image forming apparatus 70 illustrated in FIG. 4 includes a controller 201, an operation panel 202, an external I/F 203, a communication I/F 204, a printer 205, and the like.

The controller 201 includes a CPU 211, a RAM 212, a ROM 213, a non-volatile random access memory (NVRAM) 214, and an HDD 215. The ROM 213 stores various programs and data. The RAM 212 temporarily stores programs and data. The NVRAM 214 stores, for example, settings information and the like. The HDD 215 stores various programs 215$p$ and data.

The CPU 211 reads the program 215$p$, data, settings information, and the like from the ROM 213, the NVRAM 214, the HDD 215, and the like onto the RAM 212 and executes processing, thereby implementing control and functions of the entire image forming apparatus 70.

The operation panel 202 includes an input unit that receives an input from a user, and a display unit that performs display. The external I/F 203 is an interface with an external device. The external device includes a storage medium 203*a* and the like. Thus, the image forming apparatus 70 can read and/or write on the storage medium 203*a* through the external I/F 203. The storage medium 203*a* includes a flexible disk, a CD, a DVD, an SD memory card, a USB memory, and the like.

The communication I/F 204 is an interface for communicating through the network N. The image forming apparatus 70 can perform data communication through the communication I/F 204. The printer 205 is a printing device for printing and outputting print target data.

Next, the function of the printing system 100 is described with reference to FIGS. 5A to 5D. FIGS. 5A to 5D are examples of functional block diagrams illustrating the functions of the management server 60, the proxy server 50, the information processing apparatus 20, and the image forming apparatus 70 included in the printing system 100.

Figure 5A:
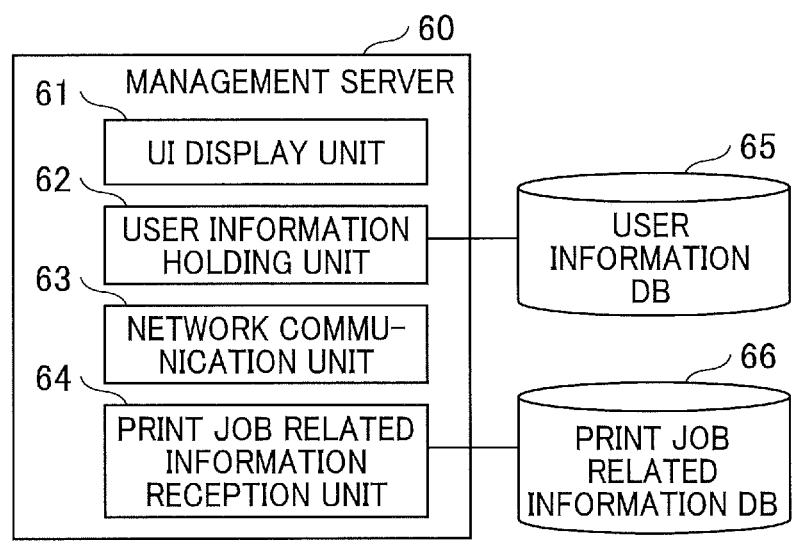
FIGS. 5A to 5D are block diagrams illustrating functions of a management server, a proxy server, an information processing apparatus, and the image forming apparatus of the printing system.

FIG. 5A illustrates a functional block diagram of the management server 60. The management server 60 includes a user interface (UI) display unit 61, a user information holding unit 62, a network communication unit 63, and a print job related information reception unit 64. Each of these functions of the management server 60 is a function implemented by the CPU 306 executing the program 308*p* expanded from the HDD 308 to the RAM 304 illustrated in FIG. 3. Note that the program 308*p* may be distributed from a server for program distribution or may be distributed while being stored in a portable storage medium such as a USB memory or an optical storage medium.

Further, the management server 60 includes a user information DB 65 and a print job related information DB 66 which are constructed in the HDD 308, the RAM 304, and the like. First, information stored in these DBs is described.

TABLE 1

| User Name | Password | Number of Prints |
|---|---|---|
| A@sample.com | **** | 123 |
| B@sample.com | **** | 12 |
| C@sample.com | **** | 31 |

Table 1 schematically illustrates the user information stored in the user information DB 65. The user information includes a user name, a password, and the number of prints associated with each other. The user name is identification information for identifying the user. The password is information used for user authentication. An integrated circuit (IC) card number, biometric authentication information, and the like may be stored. The number of printed pages is the cumulative number of pages printed by the image forming apparatus 70 in a certain period by each user. The management server 60 can calculate, for example, the remaining printable number from the print number.

TABLE 2

| Print Job ID | User Name | Information Processing Apparatus Number | Storage Date and Time |
|---|---|---|---|
| JOB001 | A@sample.com | PC001 | October 12, 20xx 13:15 |
| JOB002 | B@sample.com | PC002 | October 12, 20xx 15:20 |
| JOB003 | C@sample.com | PC003 | October 12, 20xx 16:30 |

Table 2 schematically illustrates print job related information stored in the print job related information DB 66. The print job related information is used, for example, by a user to identify a print job stored in the information processing apparatus 20. The print job related information includes a print job ID, a user name, an information processing apparatus number, and a storage date and time. The print job ID is identification information for uniquely identifying a print job stored in the information processing apparatus 20. The user name is the same as that of the user information DB 65. The information processing apparatus number is identification information for uniquely identifying the information processing apparatus 20. The storage date and time is the date and time when the print job was stored in the information processing apparatus 20.

The UI display unit 61 creates screen information of a web page including various screens displayed by the information processing apparatus 20 and provides the screen information to the information processing apparatus 20. The screen information is a program described in HyperText Markup Language (HTML), a script language, and cascading style sheet (CSS). The structure of the web page is mainly specified by HTML, the operation of the web page is specified by the script language, and the style of the web page is specified by CSS.

The user information holding unit 62 manages information about the user in the user information DB 65. Table 1 indicates an example of the user information. In addition, information such as a mail address and a user attribute may be included.

The network communication unit 63 connects to the network N and communicates with various apparatuses connected to the network N in the same manner. In the present embodiment, the network communication unit 63 communicates with the proxy server 50, the information processing apparatus 20, or the image forming apparatus 70.

The print job related information reception unit 64 receives the print job related information from the information processing apparatus 20 and stores the print job related information in the print job related information DB 66. Table 2 indicates an example of the print job related information. The print job related information may include the entire print job or the bibliographic information of the print job (for example, the file name of the print target, the number of pages, the size, the print settings, etc.) in addition to the information indicated in Table 2.

Figure 5B:
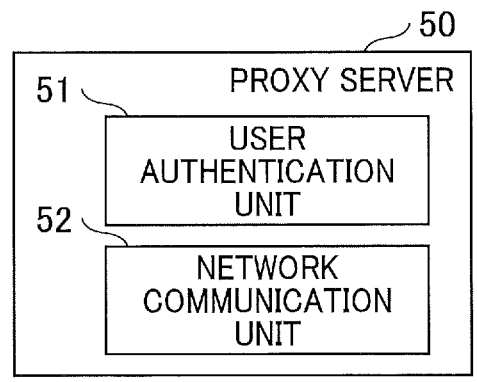

FIG. 5B illustrates a functional block diagram of the proxy server 50. The proxy server 50 includes a user authentication unit 51 and a network communication unit 52. These functions of the proxy server 50 are functions implemented by the CPU 306 executing the program 308*p* expanded from the HDD 308 to the RAM 304 illustrated in FIG. 3. Note that the program 308*p* may be distributed from a server for program distribution or may be distributed while being stored in a portable storage medium such as a USB memory or an optical storage medium.

The user authentication unit 51 requests the management server 60 for user authentication. The authentication of the user is to check the legitimacy and authenticity of the user, and the identity verification (other party authentication) for verifying by some measure that the other party is who the user claims to be is simply called authentication. When the proxy server 50 holds the user information, the proxy server 50 may authenticate the user.

The network communication unit 52 connects to the network N and communicates with various apparatuses connected to the network N in the same manner. In the present embodiment, the network communication unit 52 communicates with the management server 60, the information processing apparatus 20, or the image forming apparatus 70.

Figure 5C:
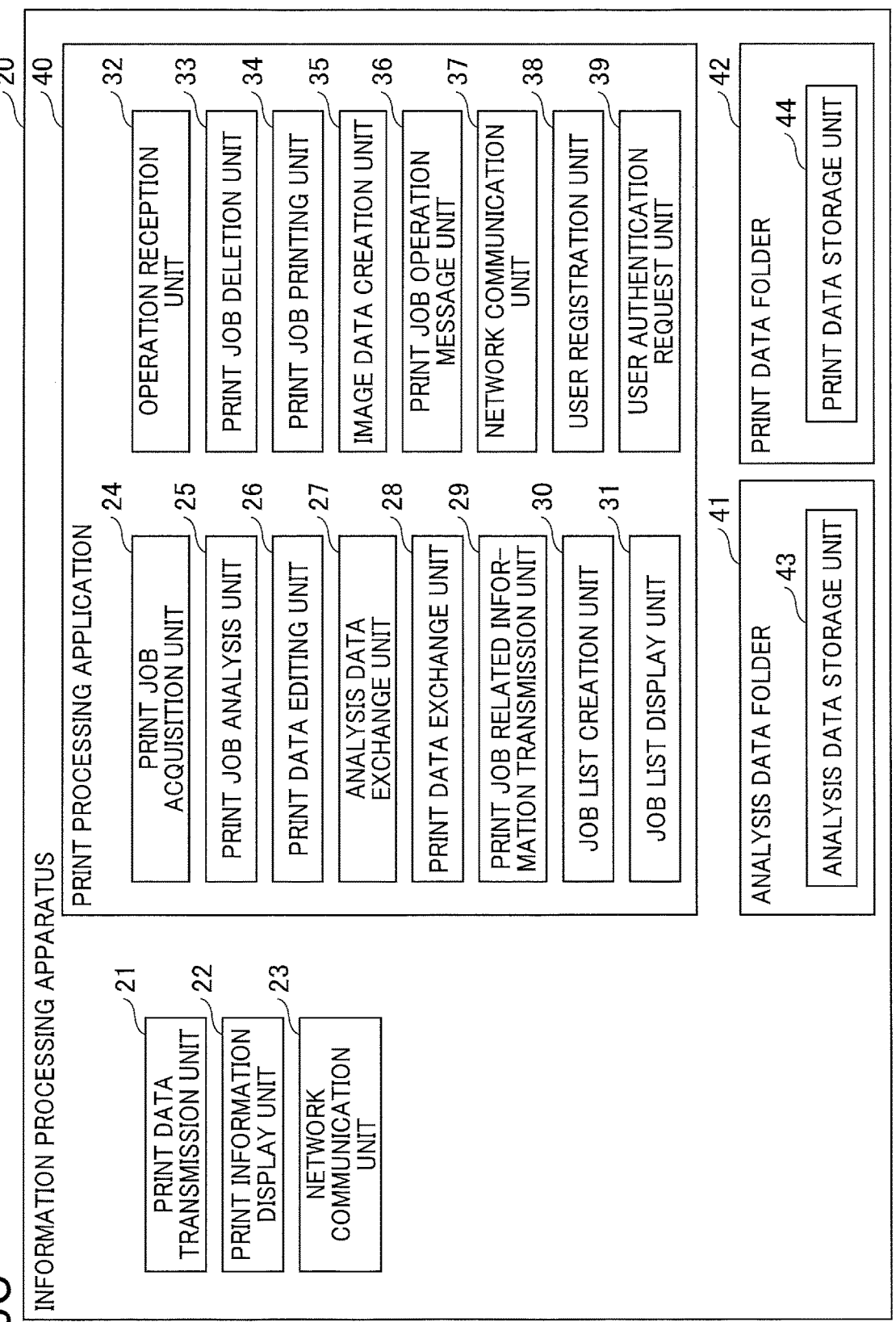

FIG. 5C illustrates a functional block diagram of the information processing apparatus 20. The information processing apparatus 20 includes a print data transmission unit 21, a print information display unit 22, and a network communication unit 23. Each of these functions of the information processing apparatus 20 is a function implemented by the CPU 306 executing the program 308*p* loaded from the HDD 308 to the RAM 304 illustrated in FIG. 3. Note that the program 308*p* may be distributed from a server for program distribution or may be distributed while being stored in a portable storage medium such as a USB memory or an optical storage medium.

The information processing apparatus 20 further includes, as functions implemented by the print processing application 40, a print job acquisition unit 24, a print job analysis unit 25, a print data editing unit 26, an analysis data exchange unit 27, a print data exchange unit 28, a print job related information transmission unit 29, a job list creation unit 30, a job list display unit 31, an operation reception unit 32, a print job deletion unit 33, a print job printing unit 34, an image data creation unit 35, a print job operation message unit 36, a network communication unit 37, a user registration unit 38, and a user authentication request unit 39.

Further, the information processing apparatus 20 has an analysis data folder 41 for storing analysis data and a print data folder 42 for storing print data (at least one of the data folders is an example of a storage unit). The analysis data folder 41 and the print data folder 42 are implemented by at least one of the HDD 308 and the RAM 304 illustrated in FIG. 3.

The print data transmission unit 21 transmits the print data to the proxy server 50 or the image forming apparatus 70. The print information display unit 22 displays the print information on the display device 302 included in the information processing apparatus 20. The print information includes print settings and print data (for example, preview) of the print job.

The network communication unit 23 connects to the network N, and communicates with various apparatuses similarly connected to the network N. In the present embodiment, the network communication unit 23 communicates with the proxy server 50, the management server 60, or the image forming apparatus 70.

The print job acquisition unit 24 acquires spool data to be spooled by the printer driver before spooling. As a result, the print job is not spooled and is not printed from the image forming apparatus 70. The spool is a function of the OS that temporarily stores a print job when a print job is transmitted from the application software to the image forming apparatus 70. The function of storing print job is called a spooler, and the print job is transmitted to the image forming apparatus 70 through the spooler.

The print job analysis unit 25 analyzes the print job and generates analysis data. The analysis data is print settings included in the print job. The print settings refer to print-related settings such as duplex or simplex, color or monochrome, number of prints, combined printing, and the like.

The print data editing unit 26 converts the print data into data described in a language (page description language (PDL)) that can be interpreted by the image forming apparatus 70. As a result, the print data is converted into a format that can be interpreted by the image forming apparatus 70, and type and size of the character to be printed, and the location of the graphic to be printed are designated. The print data editing unit 26 reflects the print settings on the print data. As described above, for example, duplex or simplex, color or monochrome, number of prints, combined printing, and the like are included in the print data.

The analysis data exchange unit 27 transmits the analysis data to the proxy server 50 as necessary. The print data exchange unit 28 transmits the print data to the image forming apparatus 70 or the proxy server 50. The print job related information transmission unit 29 sends the print job related information to the proxy server 50.

The job list creation unit 30 creates a job list including print data held in the print data folder 42 by the information processing apparatus 20. (Since print settings are reflected in the print data, the job list of print data can be said to be a job list of print job). The job list display unit 31 displays the job list on the display device 302 of the information processing apparatus 20.

The operation reception unit 32 receives an operation related to the print job stored in the information processing apparatus 20. The operation includes all operations that can be performed by the user on the print job, and includes, for example, display, deletion, and printing of the print job. Also, the print settings can be changed.

The print job deletion unit 33 deletes the print job received by the operation reception unit 32, which includes the analysis data stored in the analysis data folder 41 by the information processing apparatus 20 and the print data stored in the print data folder 42. The print job printing unit 34 prints the print job received by the operation reception unit 32, which includes the analysis data stored in the analysis data folder 41 by the information processing apparatus 20 and the print data stored in the print data folder 42, by the image forming apparatus 70.

The image data creation unit 35 creates image data (preview) of the print data. The image data is data generated for confirming a printed image on the information processing apparatus 20. The image data creation unit 35 interprets the print data described in PDL and creates the image data in the same manner as the image forming apparatus 70.

The print job operation message unit 36 creates a message relating to processing of a print job, and outputs the message on the display device 302 or the like.

The network communication unit 37 connects to the network N, and communicates with various apparatuses similarly connected to the network N. In the present embodiment, the network communication unit 37 communicates with the proxy server 50, the management server 60, or the image forming apparatus 70.

The user registration unit 38 registers user information in the management server 60 in response to a user operation. The registration of the user information may be performed once, for example, when the print processing application 40 is installed. The user authentication request unit 39 requests the proxy server 50 for user authentication.

The analysis data storage unit 43 included in the analysis data folder 41 stores the analysis data generated by the print job analysis unit 25 in association with the print job ID and the user ID. The print data storage unit 44 of the print data folder 42 stores the print data acquired by the print job acquisition unit 24 in association with the print job ID and the user ID.

Figure 5D:
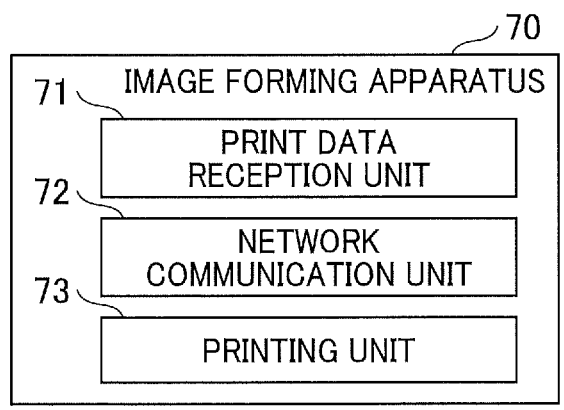

FIG. 5D is a functional block diagram of the image forming apparatus 70. The image forming apparatus 70 includes a print data reception unit 71, a network communication unit 72, and a printing unit 73. Each of these functions of the image forming apparatus 70 is implemented by the CPU 211 executing the program 215p expanded from the HDD 215 to the RAM 212 illustrated in FIG. 4. Note that the program 215p may be distributed from a server for program distribution or may be distributed while being stored in a portable storage medium such as a USB memory or an optical storage medium.

The network communication unit 72 connects to the network N, and communicates with various apparatuses similarly connected to the network N. In the present embodiment, the network communication unit 72 communicates with the proxy server 50, the management server 60, or the information processing apparatus 20.

The print data reception unit 71 receives print data from the information processing apparatus 20. The printing unit 73 forms (outputs) an image on a sheet material such as paper based on the print data.

Figure 7:
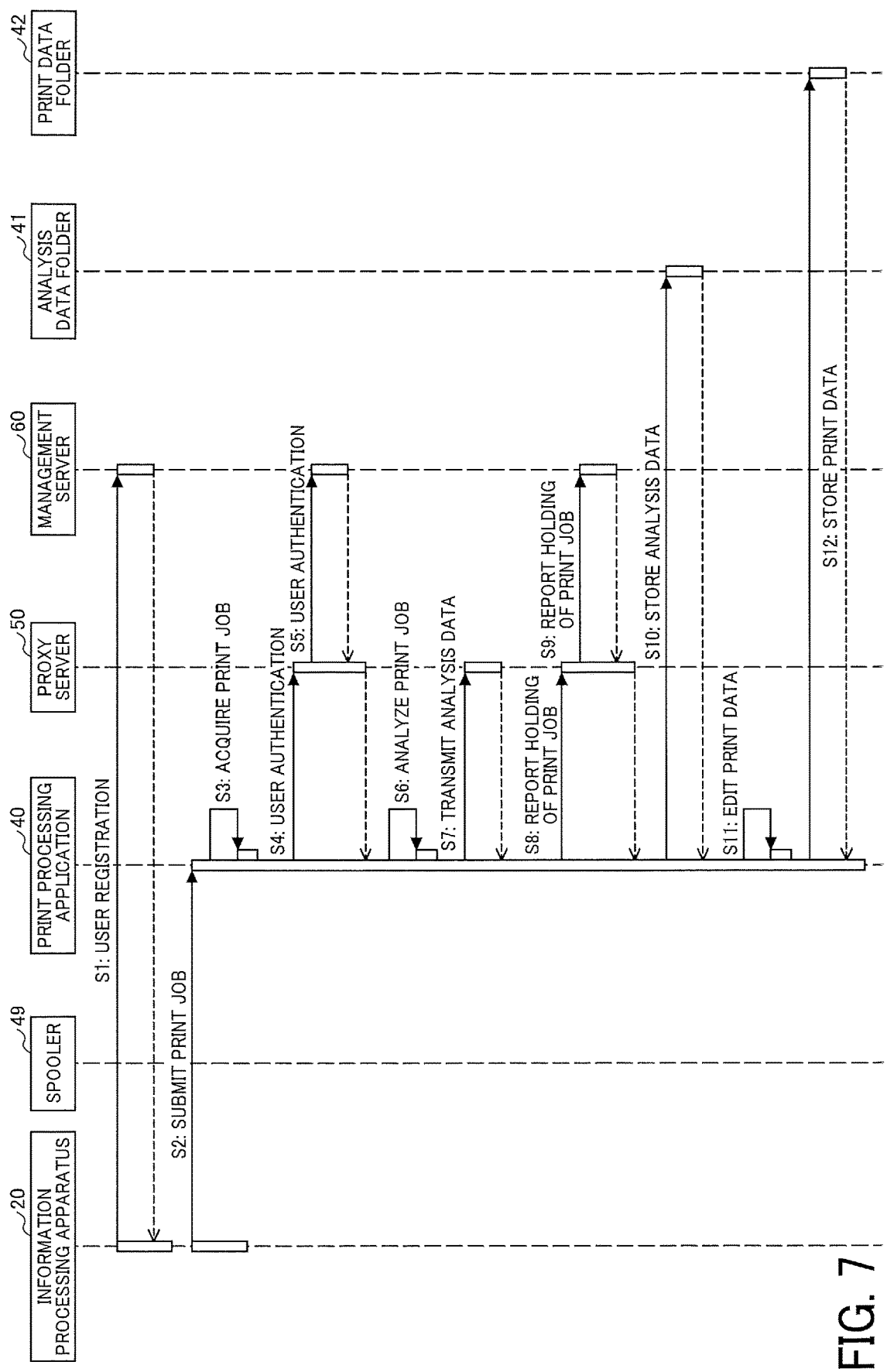
FIG. 7 is a sequence diagram illustrating an example of a procedure in which a print processing application accumulates the print job.

A process in which the print processing application 40 accumulates print job is described with reference to FIG. 6 and FIG. 7. FIG. 6 is a schematic diagram illustrating an operation of the print processing application 40 when a print job is accumulated, and FIG. 7 is a sequence diagram illustrating an example of a procedure in which the print processing application 40 accumulates print job. The step numbers in FIG. 6 and FIG. 7 correspond to each other.

S1: A user performs user registration in the management server 60. The user registration unit 38 transmits user information to the management server 60 in response to a user operation. User information on the user is registered in the management server 60 by the user registration. Further, the user name and password can be stored in the print processing application 40, and the user can be authenticated without the user entering the user name and password every time when using the print processing application 40. The user may enter a user name and a password each time.

S2: The user operates the information processing apparatus 20 to submit a print job. For example, an application program such as word processing software calls a printer driver, and the printer driver generates the print job. If the user wants to store the print job by the serverless pull printing, the user selects the printer driver of the image forming apparatus 70 that supports the serverless pull printing. The image forming apparatus 70 corresponding to the serverless pull printing is not an actual image forming apparatus 70 but a logical image forming apparatus 70, and the print processing application 40 is executed by the logical image forming apparatus 70.

S3: The print processing application 40 causes the print job acquisition unit 24 to acquire the print job that should be spooled by the spooler 49.

S4: The user authentication request unit 39 of the print processing application 40 requests the proxy server 50 to authenticate the user. The user name and password of the user may be stored at the time of registration in step S1 or may be entered each time by the user.

S5: The network communication unit 52 of the proxy server 50 receives the user authentication request, and the user authentication unit 51 requests the management server 60 to authenticate the user.

S6: The print job analysis unit 25 of the print processing application 40 analyzes the print job and generates analysis data.

S7: The analysis data exchange unit 27 of the print processing application 40 transmits the analysis data to the proxy server 50. The analysis data is transmitted in order for the proxy server 50 to manage the contents of the print job.

S8: The print job related information transmission unit 29 of the print processing application 40 notifies the proxy server 50 of the holding of the print job. Holding a print job is a process for registering in the management server 60 that the information processing apparatus 20 holds the print job. The user name and the identification information of the information processing apparatus 20 are transmitted and registered in association with each other.

S9: The network communication unit 52 of the proxy server 50 receives the notification of the holding of the print job and notifies the management server 60 of the holding of the print job. The print job related information reception unit 64 of the management server 60 receives the print job holding notification, assigns a print job ID, stores the print job ID, user name, and information processing apparatus number in the print job related information DB 66, and registers the date and time of the storage. This print job ID is notified to the information processing apparatus 20. Alternatively, the print job ID may be assigned by the print processing application 40 and transmitted to the management server 60.

S10: The print job analysis unit 25 of the print processing application 40 stores the analysis data in the analysis data storage unit 43 of the analysis data folder 41 in association with the print job ID and the user name.

S11: The print data editing unit 26 of the print processing application 40 edits the print data. The print data described in PDL is generated by reflecting the analysis data in the print data.

S12: The print data editing unit 26 of the print processing application 40 saves the edited print data in the print data storage unit 44 of the print data folder 42 in association with the print job ID and the user name.

As described above, the print data and the analysis data are accumulated in the information processing apparatus 20, and the management server 60 also records that the information processing apparatus 20 holds the print job.

Figure 8:
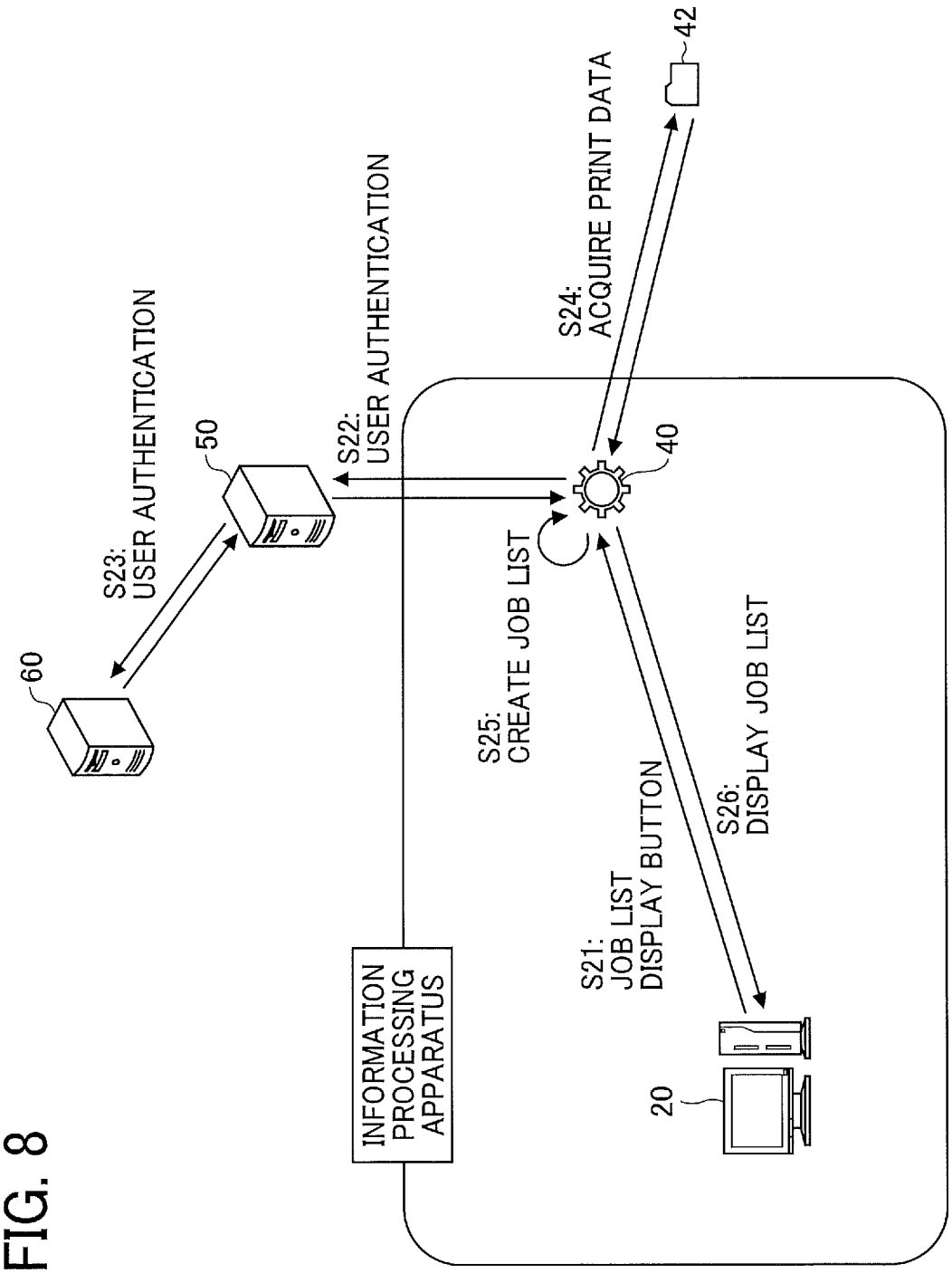
FIG. 8 is a schematic diagram illustrating an operation of the print processing application displaying a job list of print job.
Figure 9:
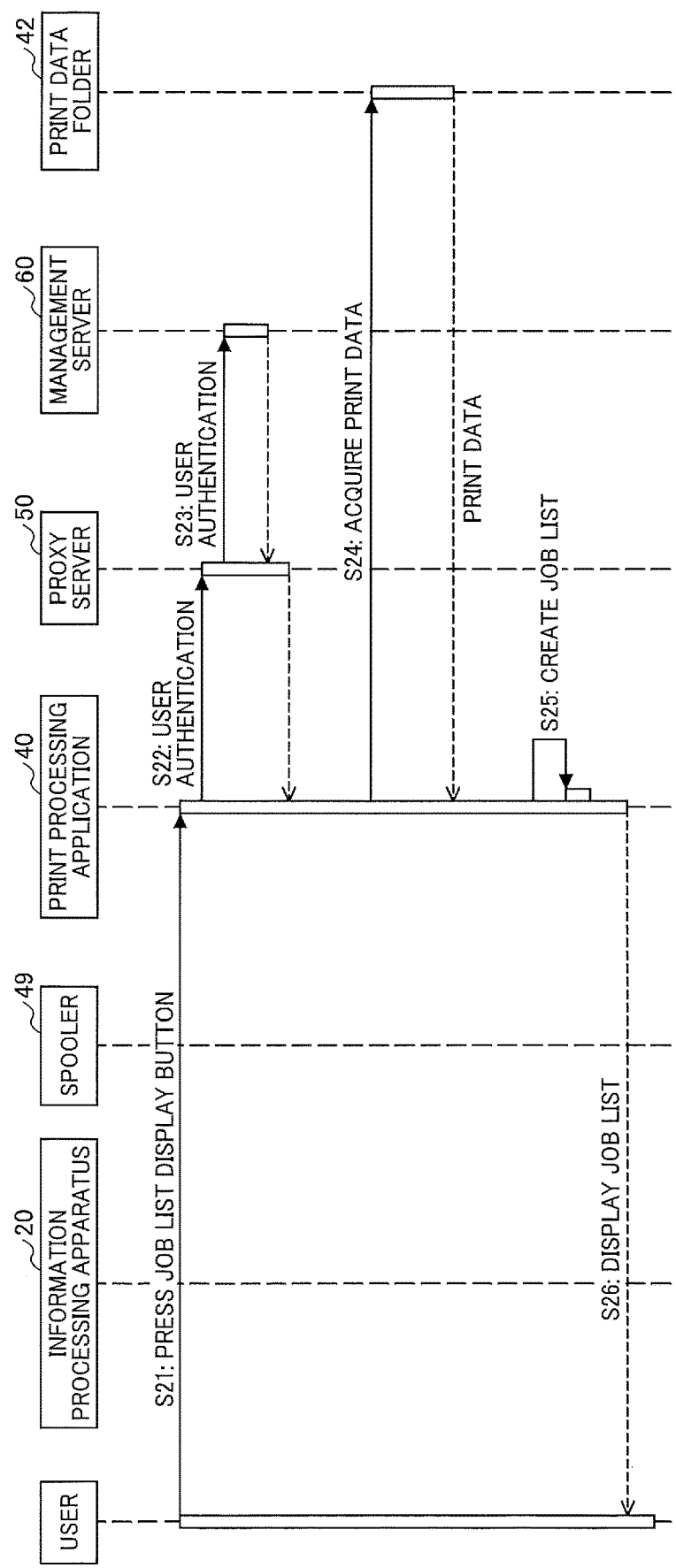
FIG. 9 is a sequence diagram illustrating the operation of the print processing application displaying the job list of print job.

A process in which the print processing application 40 displays a job list of print job is described with reference to FIG. 8 and FIG. 9. FIG. 8 is a schematic diagram illustrating an operation of the print processing application 40 displaying a print job list, and FIG. 9 is a sequence diagram illustrating the operation of the print processing application 40 displaying the print job list. The step numbers in FIG. 8 and FIG. 9 correspond to each other. In the following description of the sequence diagram, the screen examples illustrated in FIGS. 18 to 32B are referred to as necessary.

S21: The user operates the information processing apparatus 20 and presses the job list display button 402 of the print processing application 40 (refer to FIG. 18). The operation reception unit 32 receives a user operation.

S22: When the job list display button 402 is pressed, the user authentication request unit 39 of the print processing application 40 transmits a user authentication request to the proxy server 50 associated with the print processing application 40. When performing authentication with a user registered in the print processing application 40, authentication is performed using user information (user name and password) set in the print processing application 40 at the time of user registration or the like. When employing this authentication, the user must be registered in the management server 60. In the case of Windows authentication (registration authentication), authentication is performed using the user information logged in to the Windows machine (registration authentication).

S23: The network communication unit 52 of the proxy server 50 receives the user authentication request, and the user authentication unit 51 transmits the user authentication request to the management server 60. Here, the following is described assuming that the authentication is successful.

S24: When the authentication is successful, the job list creation unit 30 of the print processing application 40 acquires the stored print data of the user from the print data folder 42. The print data associated with the name of the user who has successfully logged in is acquired. If the information processing apparatus 20 is not shared, only the print data with the same user name is registered in the print data folder 42. The reason for requiring authentication always when acquiring the print data is to prevent a third party from working on the accumulated print data (from the viewpoint of personal information protection).

S25: The job list creation unit 30 of the print processing application 40 creates a job list. The job list is a list of bibliographic information (file name, size, storage date, etc.) of the print job.

Figure 18:
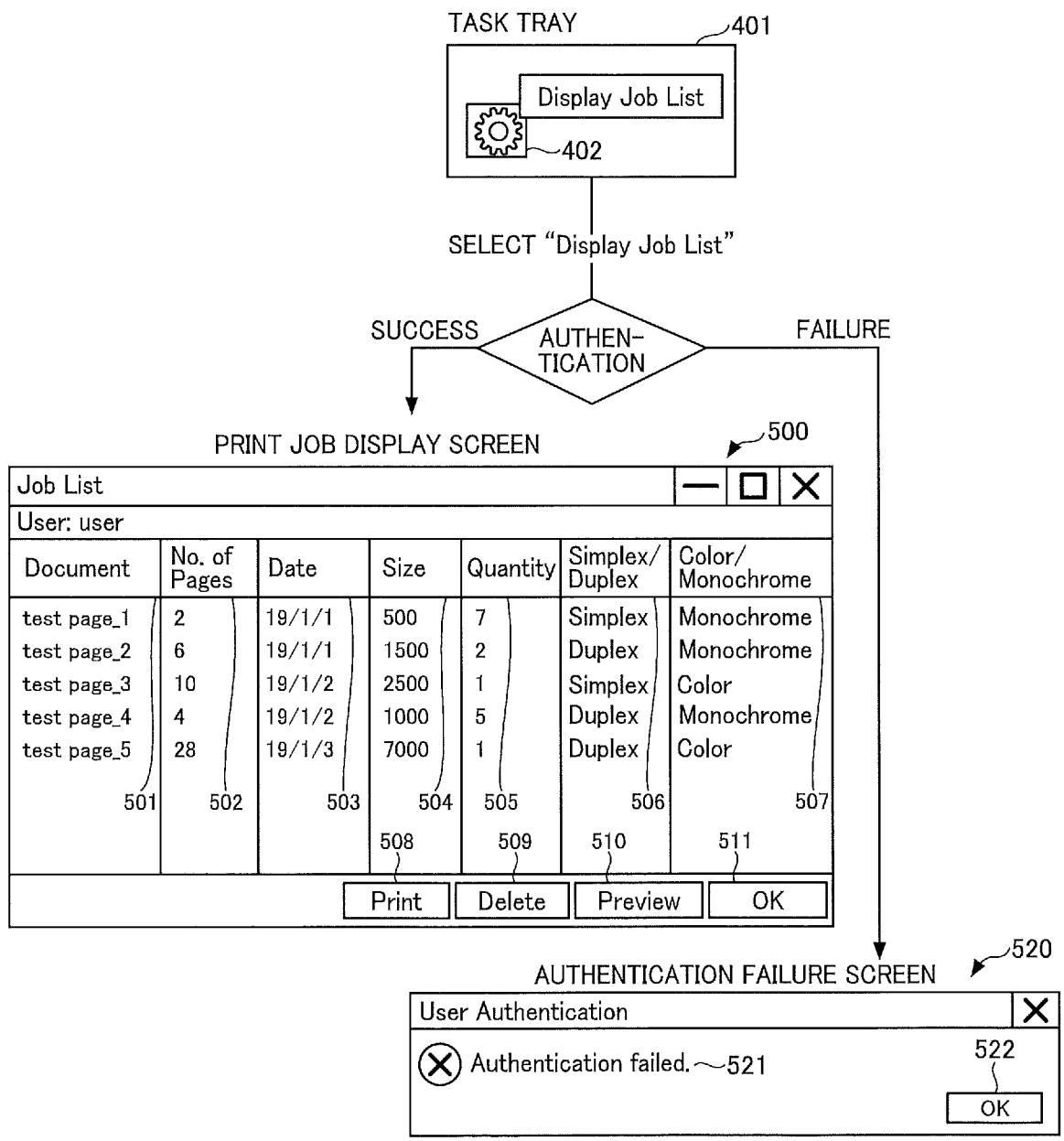
FIG. 18 is a diagram illustrating an example of a screen when a user causes the print processing application to display a job list.
Figure 25A:
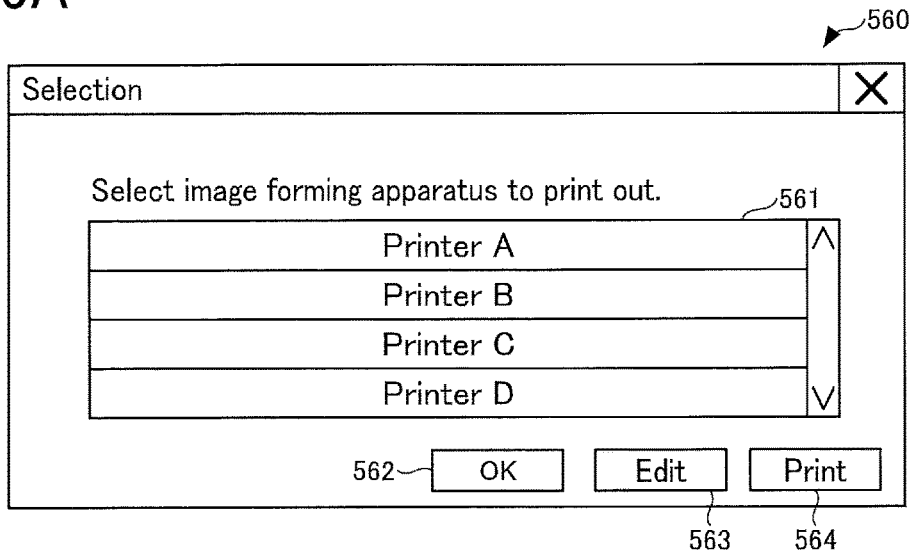
FIGS. 25A to 25D are diagrams illustrating an example of screen transition when the print button is pressed on a preview display screen.
Figure 25B:
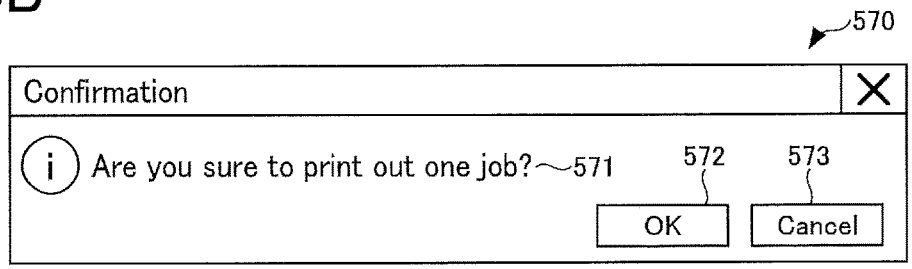
Figure 25C:
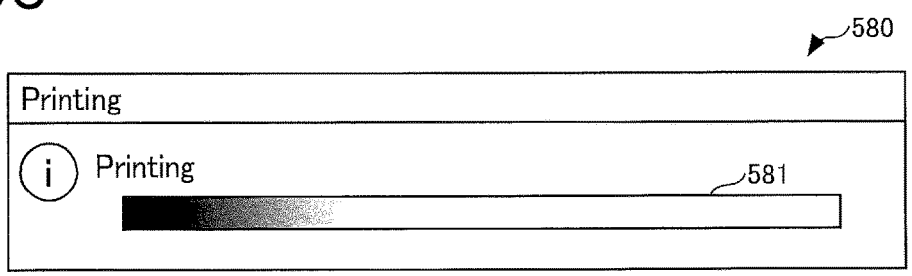
Figure 25D:
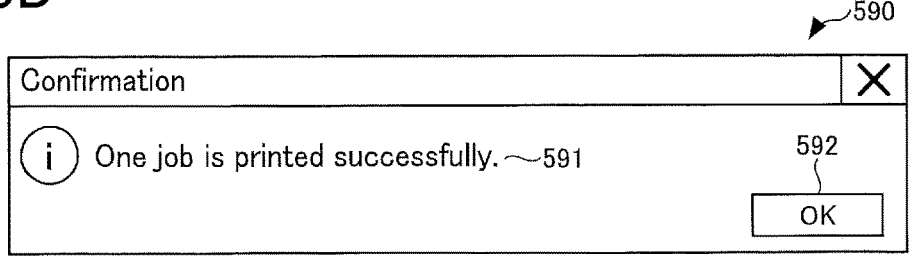

S26: The job list display unit 31 of the print processing application 40 displays the job list created by the job list creation unit 30 on the display device 302 or the like. FIG. 18 illustrates a print job display screen 500 for displaying the job list.

As described above, the print job list can be displayed on the information processing apparatus 20 since the print processing application 40 acquires the information of the print job stored in the information processing apparatus 20 directly from the information processing apparatus 20.

Figure 10:
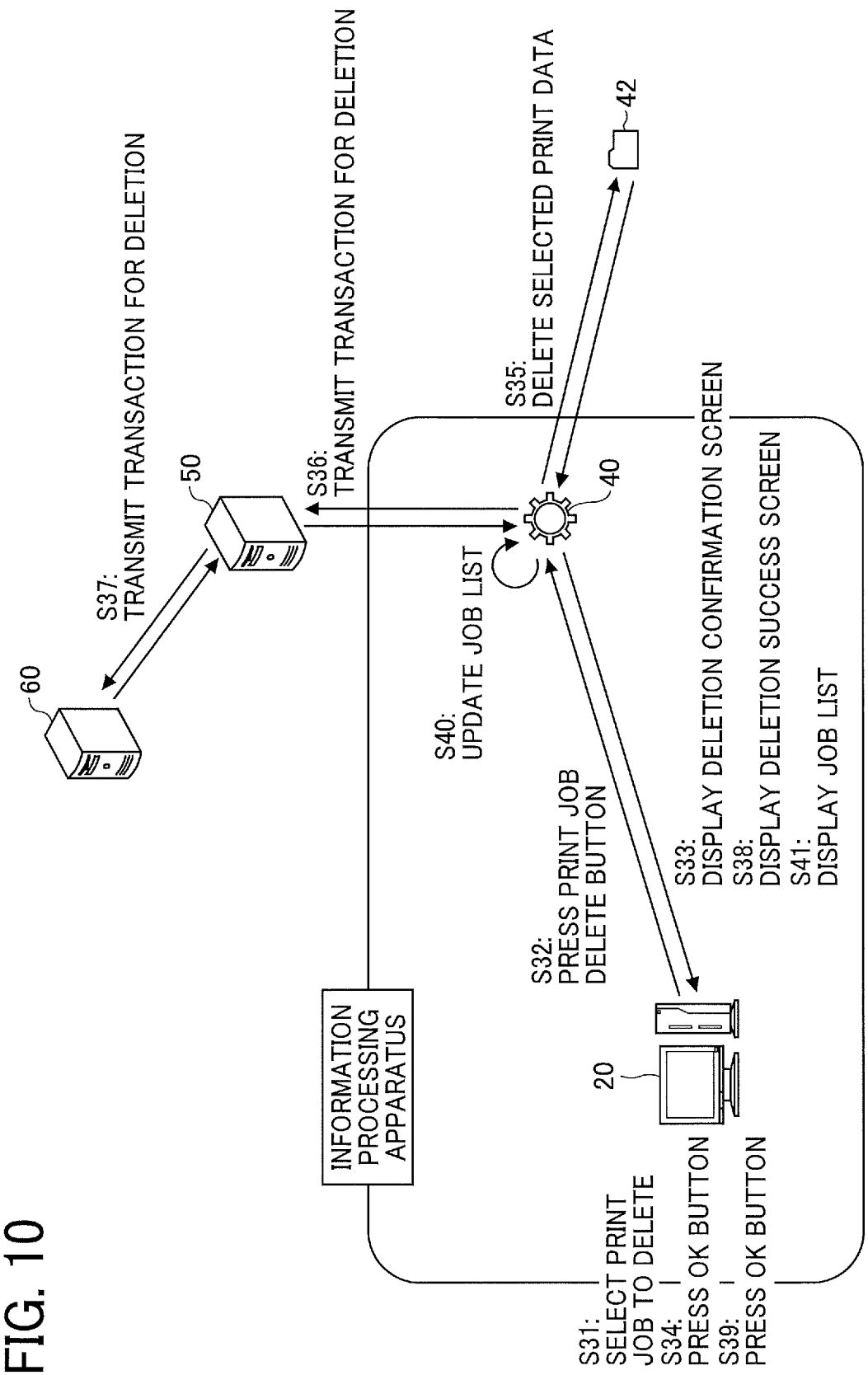
FIG. 10 is a schematic diagram illustrating the operation of the print processing application deleting a print job.
Figure 11:
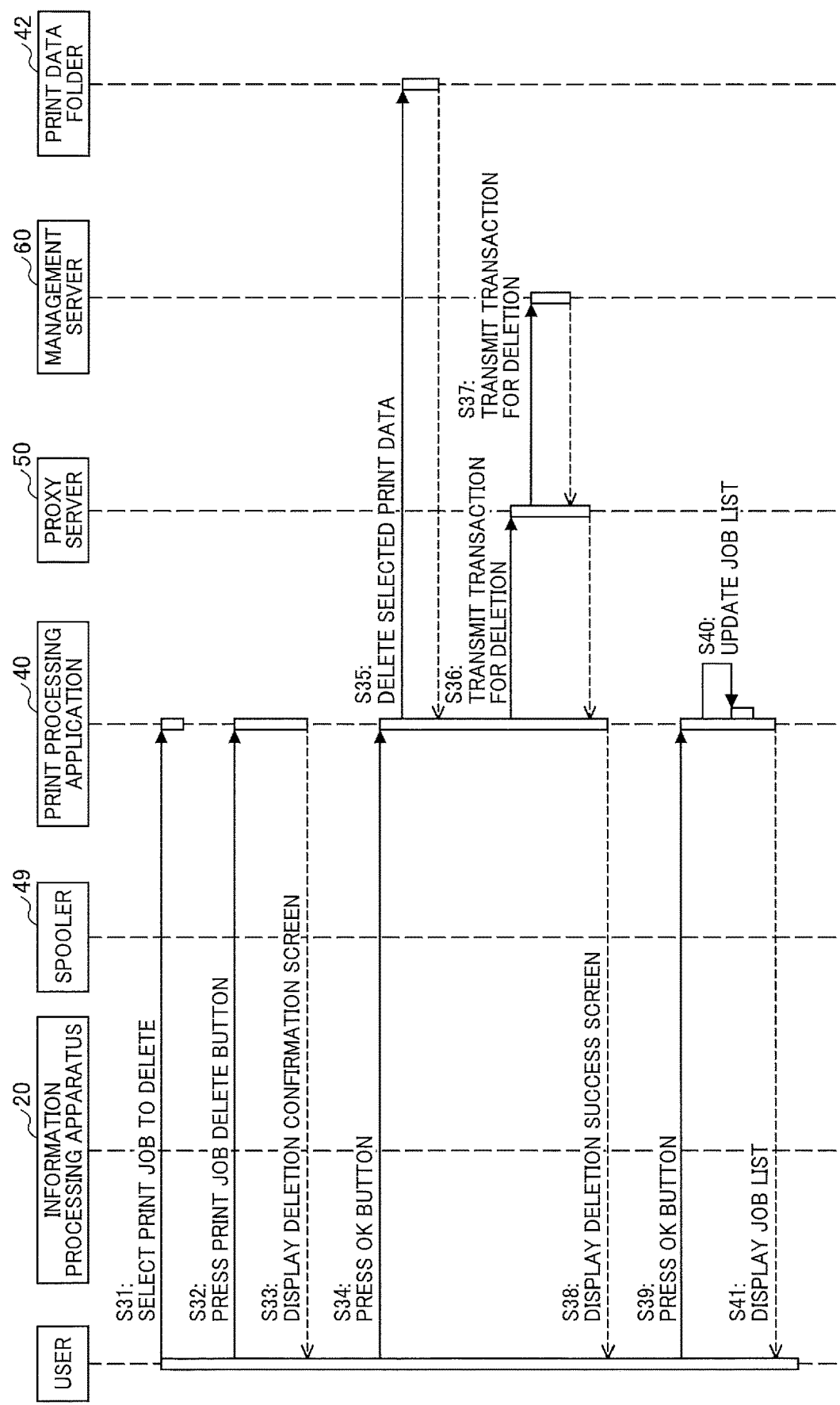
FIG. 11 is a sequence diagram illustrating an example of a procedure in which the print processing application deletes a print job.

A process in which the print processing application 40 deletes a print job is described with reference to FIG. 10 and FIG. 11. FIG. 10 is a schematic diagram illustrating an operation of the print processing application 40 deleting the print job and FIG. 11 is a sequence diagram illustrating an example of a procedure in which the print processing application 40 deletes the print job. The step numbers in FIG. 10 and FIG. 11 correspond to each other.

S31: The user selects a print job to be deleted from the displayed print job display screen 500 (refer to FIG. 19A). The operation reception unit 32 receives a selection of print job. The selected print job is identified by the print job ID.

S32: The user presses a delete button 509 on the print job display screen 500. The operation reception unit 32 receives a press of the delete button 509. As a result, a deletion confirmation screen 530 illustrated in FIG. 19B is displayed.

S33: The job list display unit 31 of the print processing application 40 displays a deletion confirmation screen 530.

S34: The user presses the OK button 532 on the deletion confirmation screen 530 after confirming that the deletion should be performed. The operation reception unit 32 receives a press of the OK button 532.

S35: The print job deletion unit 33 of the print processing application 40 deletes the selected analysis data stored in the analysis data folder 41 and the selected print job stored in the print data folder 42. During the deletion, the job list display unit 31 displays a deletion progress confirmation screen 540 on the display device 302 (refer to FIG. 19C).

S36: The print job related information transmission unit 29 of the print processing application 40 transmits a transaction for deleting the deleted print job (identified by the print job ID) to the proxy server 50. The deletion transaction is a transaction transmitted only when a print job that has never been printed is deleted. The transaction is transmitted to delete the record of holding of print job from the management server 60.

S37: The network communication unit 52 of the proxy server 50 receives the deletion transaction and transmits the deletion transaction to the management server 60. The network communication unit 63 of the management server 60 receives the deletion transaction, and the print job related information reception unit 64 deletes the print job holding information from the print job related information DB 66.

S38: The job list display unit 31 of the print processing application 40 displays a deletion success screen 550 including a message 551 indicating that the print job has been deleted on the display device 302 (refer to FIG. 19D).

S39: The user presses an OK button 552 indicating that the deletion has been confirmed on the deletion success screen 550. The operation reception unit 32 receives a press of the OK button 552.

S40: The job list creation unit 30 of the print processing application 40 updates the job list to the latest status. As a result, one or more print jobs are reduced in the job list.

S41: The job list display unit 31 of the print processing application 40 displays a print job display screen 500 including the updated job list on the display device 302 (refer to FIG. 20).

As described above, the print processing application 40 can acquire and display the information of the print job stored in the information processing apparatus 20 directly from the information processing apparatus 20 and delete the print job selected by the user.

Figure 12:
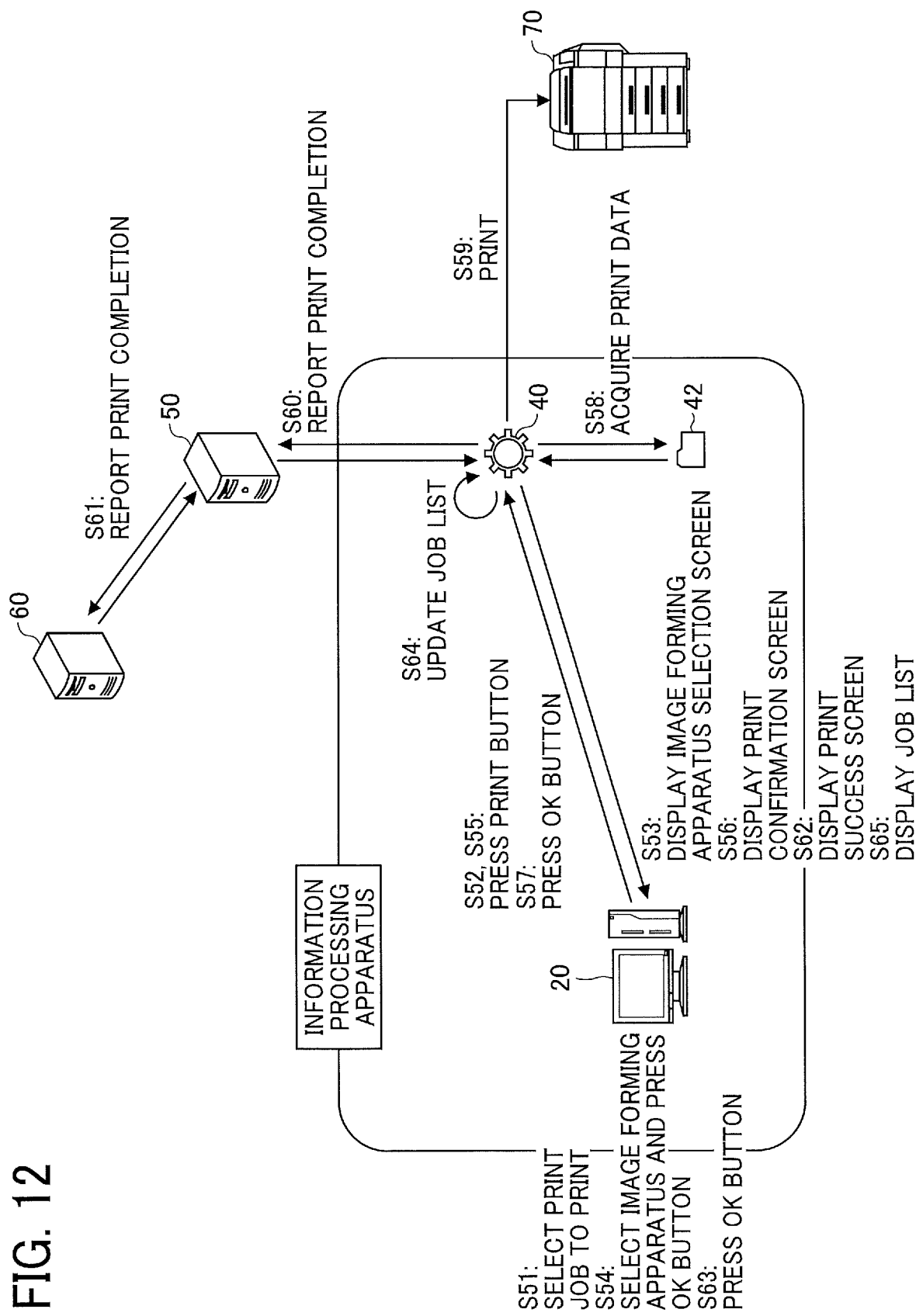
FIG. 12 is a schematic diagram illustrating an operation of the print processing application printing a print job.
Figure 13B:
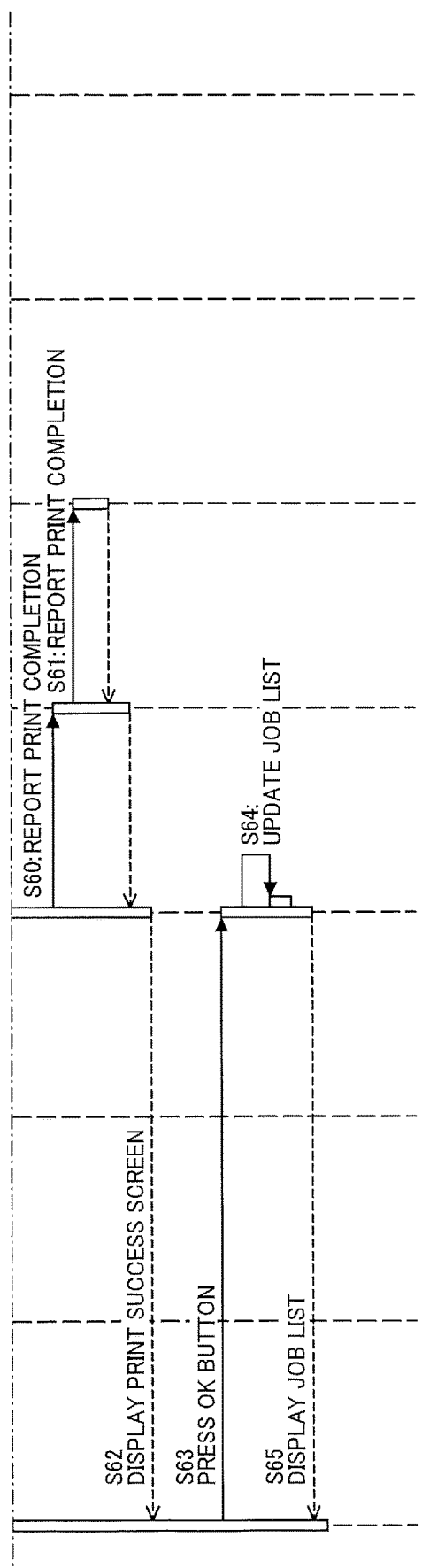

A process in which the print processing application 40 prints a print job is described with reference to FIG. 12, FIG. 13A, and FIG. 13B. FIG. 12 is a schematic diagram illustrating an operation of the print processing application 40 printing a print job and FIG. 13A and FIG. 13B are sequence diagrams illustrating an example of a procedure in which the print processing application 40 prints the print job. The step numbers in FIG. 12 and FIGS. 13A and 13B correspond to each other.

S51: The user selects a print job to be printed from the job list displayed on the print job display screen 500 as illustrated in FIG. 21A. The operation reception unit 32 receives a selection of print job. The selected print job is identified by the print job ID.

S52: The user presses the print button 508 on the print job display screen 500. The operation reception unit 32 receives a press of the print button 508.

S53: The job list display unit 31 of the print processing application 40 displays the image forming apparatus selection screen 560 illustrated in FIG. 21B on the display device 302.

S54: The user selects the image forming apparatus 70 for which the user wants to output the print job and presses the OK button 562. The operation reception unit 32 receives these operations.

S55: The user presses the print button 564 on the image forming apparatus selection screen 560. The operation reception unit 32 receives a press of the print button 564.

S56: The job list display unit 31 of the print processing application 40 displays a print confirmation screen 570 illustrated in FIG. 21C.

S57: The user confirms the printing and presses an OK button 572 on the print confirmation screen 570. The operation reception unit 32 receives pressing of the OK button 572.

S58: The print job printing unit 34 of the print processing application 40 acquires the print data selected by the user from the print data folder 42.

S59: The print job printing unit 34 of the print processing application 40 transmits the print data to the selected image forming apparatus 70. The network communication unit 72 of the image forming apparatus 70 receives the print data, and the printing unit 73 prints the print data. During printing, the job list display unit 31 displays a print progress screen 580 illustrated in FIG. 22A on the display device 302.

S60: The print job related information transmission unit 29 of the print processing application 40 reports the print completion to the proxy server 50 together with the number of pages printed, the print job ID, and the user name.

S61: The network communication unit 52 of the proxy server 50 also reports the print completion to the management server 60. As a result, the print job related information is updated in the management server 60. Further, the number of prints of the authenticated user is calculated according to the print job.

S62: When the notification of the print completion is obtained from the image forming apparatus 70 (or when no error is received), the job list display unit 31 of the print processing application 40 displays, as illustrated in FIG. 22B, a print success screen 590 including a message 591 indicating that the print job has been printed, on the display device 302.

S63: The user presses an OK button 592 on the print success screen 590. The operation reception unit 32 receives a press of the OK button 592.

S64: The job list creation unit 30 of the print processing application 40 updates the job list to the latest status. The printed job is identified by the print job ID, and the analysis data in the analysis data folder 41 and the print data in the print data folder 42 are deleted upon completion of printing. Alternatively, completion of the printing is recorded and reflected in the job list (the print job is deleted from the job list).

S65: The job list display unit 31 of the print processing application 40 displays a print job display screen 500 including the updated job list on the display device 302 (refer to FIG. 22C).

As described above, the print processing application 40 can acquire and display the information of the print job stored in the information processing apparatus 20 directly from the information processing apparatus 20 and print the print job selected by the user.

Figure 15:
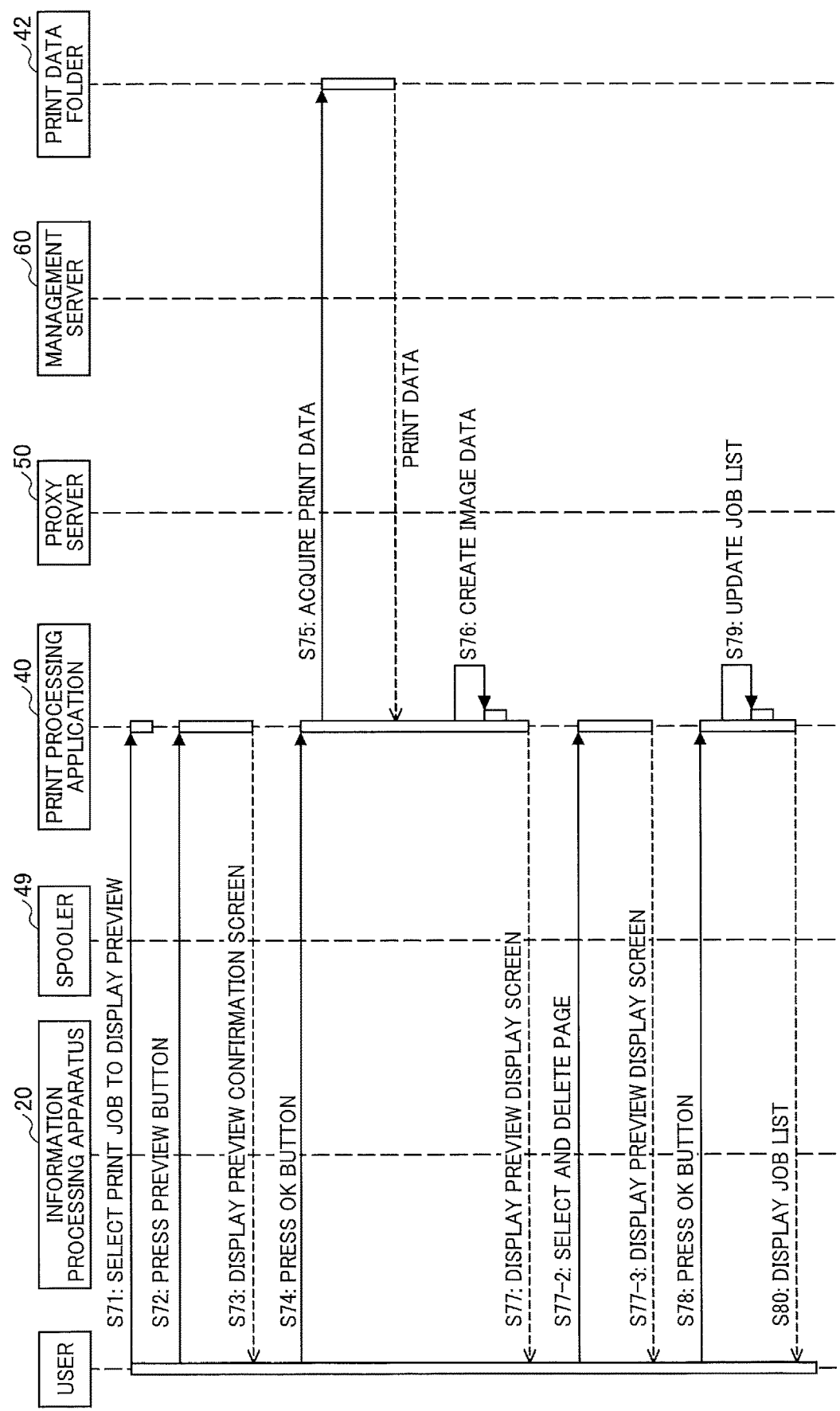
FIG. 15 is a sequence diagram illustrating an example of a procedure in which the print processing application displays the preview of print data.

A process in which the print processing application 40 displays a preview of print data is described with reference to FIG. 14 and FIG. 15. FIG. 14 is a schematic diagram illustrating an operation of the print processing application 40 displaying the preview of print data, and FIG. 15 is a sequence diagram illustrating an example of a procedure in which the print processing application 40 displays the preview of print data. The step numbers in FIG. 14 and FIG. 15 correspond to each other.

S71: A user selects a print job to display a preview from the job list displayed on the print job display screen 500 (refer to FIG. 23A). The operation reception unit 32 receives a selection of print job. The selected print job is identified by the print job ID.

S72: The user presses a preview button 510 on the print job display screen 500. The operation reception unit 32 receives pressing of the preview button 510.

S73: The job list display unit 31 of the print processing application 40 displays a preview confirmation screen 600 on the display device 302 (refer to FIG. 23B).

S74: The user presses an OK button 602 on the preview confirmation screen 600. The operation reception unit 32 receives pressing of the OK button 602.

S75: The image data creation unit 35 of the print processing application 40 acquires the selected print data from the print data folder 42.

S76: The image data creation unit 35 of the print processing application 40 creates image data from the print data.

S77: The job list display unit 31 of the print processing application 40 displays a preview display screen 610 on the display device 302 as illustrated in FIG. 23C.

S77-2: The user selects any page on the preview display screen 610 and presses a delete button 632. The operation reception unit 32 receives pressing of the delete button 632 (refer to FIG. 32A and FIG. 32B for deletion of a page).

S77-3: The print data editing unit 26 of the print processing application 40 deletes the page selected by the user from the print data.

Note that the deletion of page is possible on the preview display screen 610. Note also that the deletion of page is not necessary for all print data, and the user may delete any page.

S78: The user presses the OK button 615 on the preview display screen 610 after checking the preview. The operation reception unit 32 receives pressing of the OK button 615.

S79: The job list creation unit 30 of the print processing application 40 updates the job list to the latest status. Here, since neither deletion nor printing has been performed, no change is made on the job list.

S80: The job list display unit 31 of the print processing application 40 displays the print job display screen 500 including the updated job list on the display device 302 (refer to FIG. 24).

Note that the user can confirm the preview in step S78 and press the print button to perform printing. The process is as follows.

1. The user presses the print button 616 on the preview display screen 610 illustrated in FIG. 23C.

2. The same processing as steps S53 to S65 in FIG. 13A and FIG. 13B is performed. The screen transition in this case is illustrated in FIGS. 25A to 25D and FIG. 26. The screen transition is the same as when printing from the print job display screen 500.

As described above, the print processing application 40 can acquire the information of the print job stored in the information processing apparatus 20 directly from the information processing apparatus 20 and display the preview information.

When printing only a selected page, the print button 508 of the print job display screen 500 may be used, or the preview button 510 of the print job display screen 500 may be used.

Figure 27A:
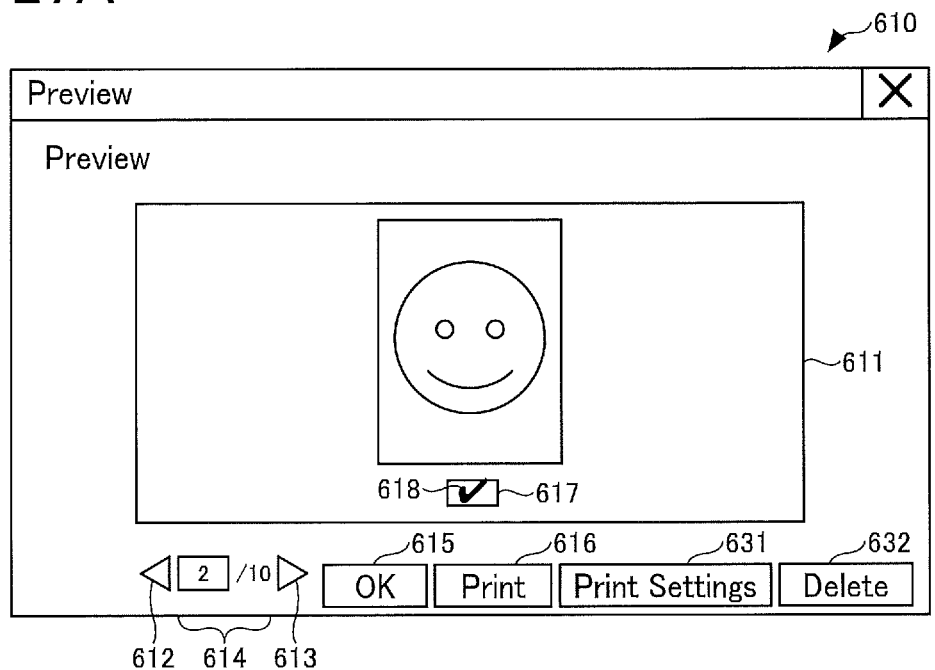
FIG. 27A and FIG. 27B are diagrams illustrating an example of screen transition when a page is designated, and the print button is pressed on the preview display screen.
Figure 27B:
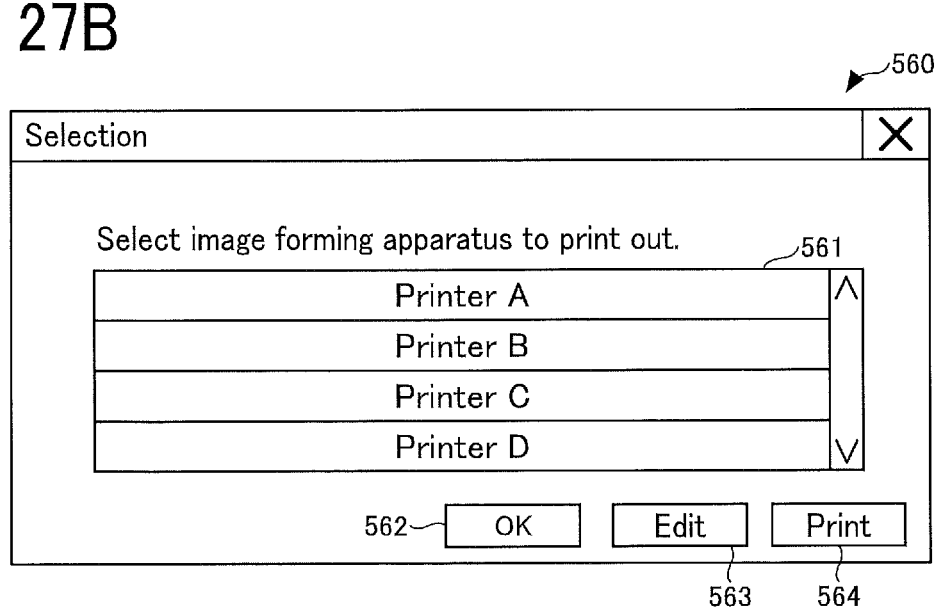

FIGS. 27A to 27B and FIGS. 28A to 28D illustrate screen transition when only a selected page is printed using the print button 508. As illustrated in FIG. 27A, the user displays a preview, selects a page with the check mark 618, and presses the print button 616. Thereafter, an image forming apparatus selection screen 560 is displayed, and the processing of steps S53 to S65 in FIG. 13 A and FIG. 13B is executed.

Hereinafter, a case where the preview button 510 of the print job display screen 500 is pressed is described.

Figure 16:
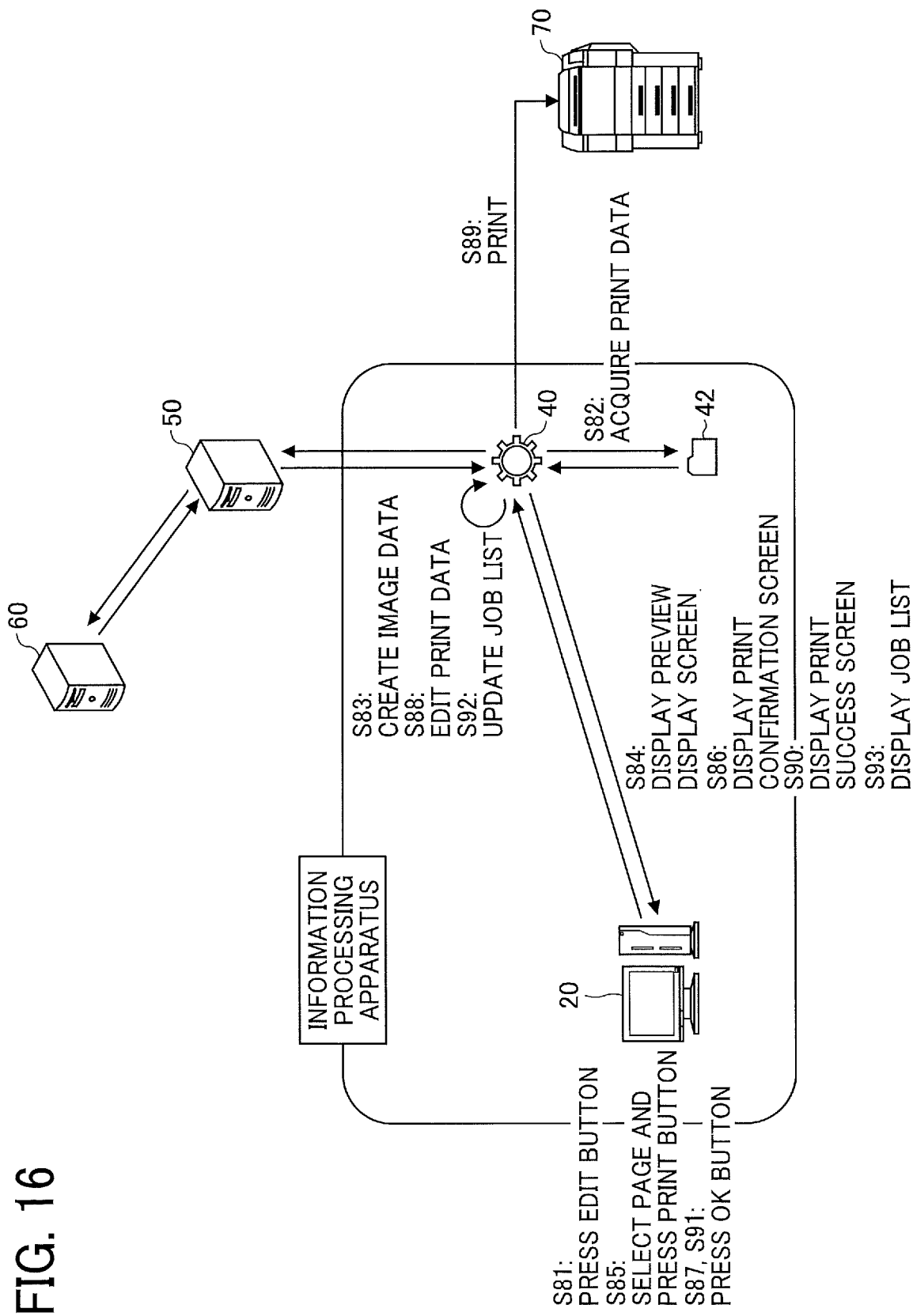
FIG. 16 is a schematic diagram illustrating an operation of the print processing application printing a page of print data.
Figure 17:
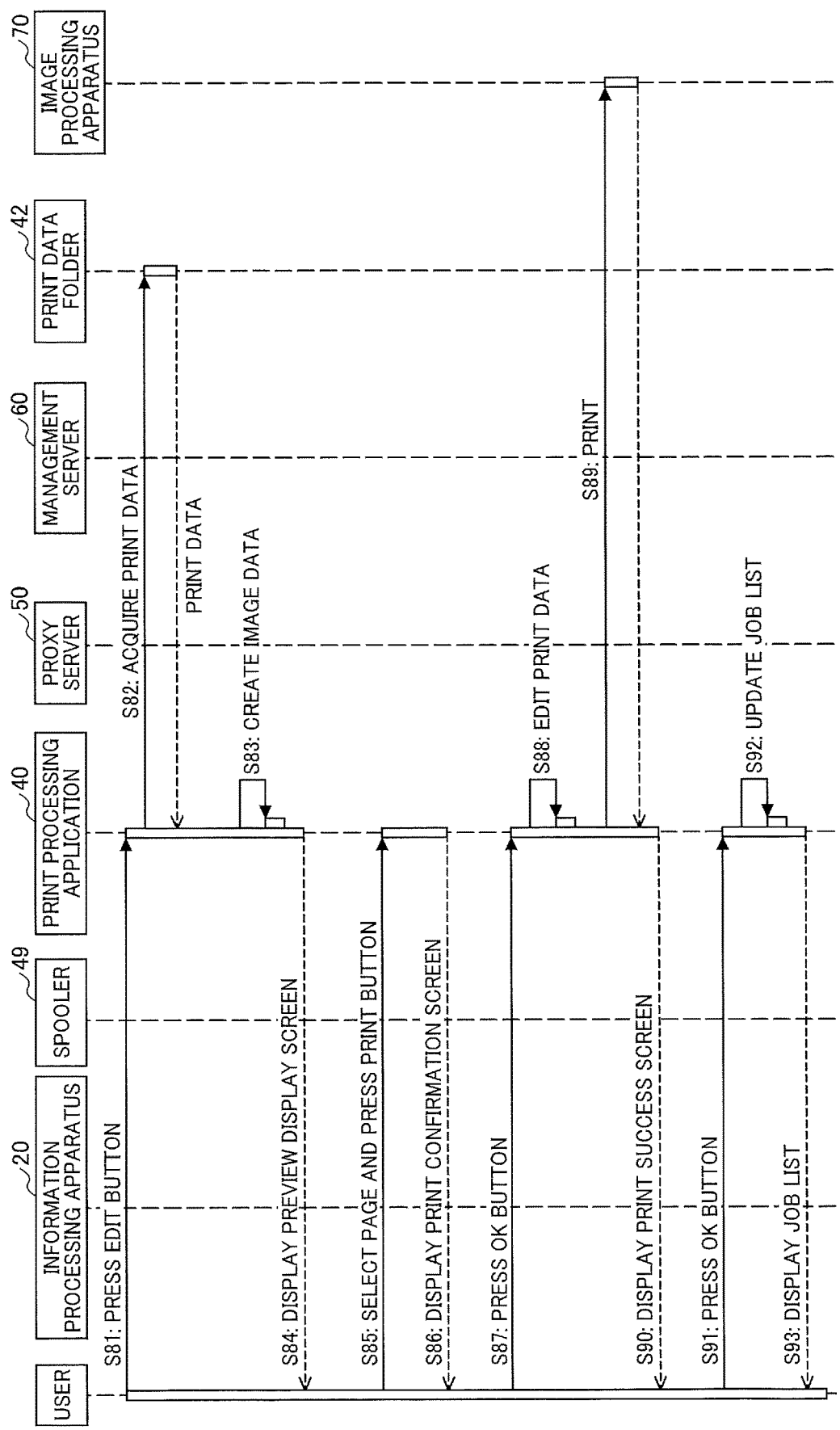
FIG. 17 is a sequence diagram illustrating an example of a procedure in which the print processing application prints a page of print data.

A process in which the print processing application 40 prints only a selected page is described with reference to FIG. 16 and FIG. 17. FIG. 16 is a schematic diagram illustrating an operation of the print processing application 40 printing the selected page of print data, and FIG. 17 is a sequence diagram illustrating an example of a procedure in which the print processing application 40 prints the selected page. The step numbers in FIG. 16 and FIG. 17 correspond to each other.

S81: The user designates a print job to be printed from the print job display screen 500, presses the print button 508, and presses the print settings edit button 563 on the image forming apparatus selection screen 560 (refer to FIG. 21B). The operation reception unit 32 receives a press of the edit button 563. The user can change duplex or simplex, color or monochrome, number of prints, and the like (for editing print settings, refer to FIGS. 31A to 31D).

S82: The image data creation unit 35 of the print processing application 40 acquires print data from the print data folder 42.

S83: The image data creation unit 35 of the print processing application 40 creates image data from the print data.

S84: The job list display unit 31 displays a preview display screen 610 illustrated in FIG. 29A.

S85: The user changes the page on the preview display screen 610, selects a page, and presses the print button 616 (refer to FIG. 29B). The operation reception unit 32 receives a press of the print button 616.

S86: The job list display unit 31 of the print processing application 40 displays a print confirmation screen 570 illustrated in FIG. 30A on the display device 302.

S87: The user presses an OK button 572 on the print confirmation screen 570. The operation reception unit 32 receives pressing of the OK button 572.

S88: The print processing application 40 edits the print data from the print data and the user's settings. The print data editing unit 26 edits the print data according to the user settings selected in step S81.

S89: The print job printing unit 34 of the print processing application 40 prints the target print job on the selected image forming apparatus 70. During printing, the job list display unit 31 displays a print progress screen 580 illustrated in FIG. 30B on the display device 302.

S90: The job list display unit 31 of the print processing application 40 displays a print success screen 590 including a message 591 indicating that the print job has been printed on the display device 302 (refer to FIG. 30C).

S91: The user presses an OK button 592 on the print success screen 590. The operation reception unit 32 receives a press of the OK button 592.

S92: The job list creation unit 30 of the print processing application 40 updates the job list to the latest status.

S93: The job list display unit 31 of the print processing application 40 displays a print job display screen 500 including the updated job list on the display device 302 (refer to FIG. 30D).

As described above, the print processing application 40 can acquire and display the information of the print job stored in the information processing apparatus 20 directly from the information processing apparatus 20 and can print only the page selected by the user.

Although the printing of a selected page has been described with reference to FIG. 16 and FIG. 17, the user can change duplex or simplex, color or monochrome, number of prints, and the like, after pressing the edit button 563.

Hereinafter, screen transition used in the above sequence diagrams and the like is described with reference to screen examples of FIGS. 18 to 32B.

FIG. 18 is a diagram illustrating an example of a screen when a user causes the print processing application 40 to display a job list. First, the user presses a job list display button 402 displayed on the task tray of the information processing apparatus 20. The job list display button 402 is also referred to as an icon and is a display component for receiving an instruction from a user to display the job list of print job stored in the information processing apparatus 20. Accordingly, an authentication screen is displayed, and when the user inputs a user ID and password as necessary, the information processing apparatus 20 transmits the user ID and password to the management server 60, and authentication is performed by the management server 60.

When the authentication is successful, the job list display unit 31 of the information processing apparatus 20 displays a print job display screen 500. The print job display screen 500 is a screen for displaying the job list of print job. The print job display screen 500 has columns for document name 501, number of pages 502, date 503, size 504, quantity 505, simplex or duplex 506, and color or monochrome 507. The user can confirm the job list and select a print job to be processed.

The print job display screen 500 further includes a print button 508, a delete button 509, a preview button 510, and an OK button 511. The print button 508 is a button for executing printing of a print job selected by the user. The delete button 509 is a button for executing deletion of a print job selected by the user. The preview button 510 is a button for the information processing apparatus 20 to display a preview of a print job selected by the user. The OK button 511 is a button for closing the print job display screen 500. The print button 508, the delete button 509, and the preview button 510 are display components for receiving instruction related to a print job.

If the authentication has failed, the job list display unit 31 of the information processing apparatus 20 displays an authentication failure screen 520. The authentication failure screen 520 displays a message 521 "Authentication failed." and an OK button 522.

FIGS. 19A to 19D and FIG. 20 are diagrams illustrating screen transition displayed when the delete button 509 is pressed on the print job display screen 500. FIG. 19A illustrates the print job display screen 500. When the delete button 509 is pressed, the job list display unit 31 displays a deletion confirmation screen 530 illustrated in FIG. 19B. The deletion confirmation screen 530 includes a message 531 "Are you sure to delete one job?", an OK button 532, and a cancel button 533. The OK button 532 is a button for starting deletion, and the cancel button 533 is a button for canceling deletion.

When the OK button 532 is pressed, the job list display unit 31 displays a deletion progress confirmation screen 540 illustrated in FIG. 19C. The deletion progress confirmation screen 540 is a screen displayed during deletion of a print job and displays a progress bar 541.

When the print job deletion unit 33 completes the deletion of the print job, the screen changes from the deletion progress confirmation screen 540 to a deletion success screen 550 as illustrated in FIG. 19D. The deletion success screen 550 displays a message 551 "One job successfully deleted." and an OK button 552. The OK button 552 is a button for closing the deletion success screen 550.

When the OK button 552 is pressed, the print job display screen 500 is displayed again as illustrated in FIG. 20.

FIGS. 21A to 21C and FIGS. 22A to 22C are diagrams illustrating screen transition displayed when the print button 508 is pressed on the print job display screen 500. A print job display screen 500 is illustrated in FIG. 21A. When the print button 508 is pressed, the job list display unit 31 displays an image forming apparatus selection screen 560 illustrated in FIG. 21B.

The image forming apparatus selection screen 560 is a screen for receiving selection of the image forming apparatus 70 to outputs a print job. The image forming apparatus selection screen 560 includes a list 561 of the image forming apparatus 70, an OK button 562, an edit button 563, and a print button 564. The list 561 of the image forming apparatus 70 displays a list (Printers A to D) of the image forming apparatuses 70 that can be used for printing by the printer driver installed in the information processing apparatus 20.

When the user selects the image forming apparatus 70 and presses the print button 564, the job list display unit 31 displays a print confirmation screen 570 illustrated in FIG. 21C. The print confirmation screen 570 displays a message 571 "Are you sure to print out one job?", an OK button 572, and a cancel button 573. The OK button 572 is a button to start printing, and the cancel button 573 is a button for closing the print confirmation screen 570.

When the user presses the OK button 572, the job list display unit 31 displays a print progress screen 580 illustrated in FIG. 22A. The print progress screen 580 displays a progress bar 581 indicating progress of the printing.

When the print job printing unit 34 completes printing the print job, the screen changes from the print progress screen 580 to a print success screen 590 illustrated in FIG. 22B. The print success screen 590 displays a message 591 "One job is printed successfully." and an OK button 592. The OK button 592 is a button for closing the print success screen 590.

When the OK button 592 is pressed, the print job display screen 500 is displayed again as illustrated in FIG. 22C.

FIGS. 23A to 23C and FIG. 24 are diagrams illustrating screen transition displayed when a preview button 510 is pressed on the print job display screen 500. A print job display screen 500 is illustrated in FIG. 23A. When the user selects a print job and presses the preview button 510, the job list display unit 31 displays a preview confirmation screen 600 illustrated in FIG. 23B. The preview confirmation screen 600 displays a message 601 "Are you sure to preview one job?", an OK button 602, and a cancel button 603. The OK button 602 is a button for starting display of the preview, and the cancel button 603 is a button for canceling preview.

When the OK button 602 is pressed, the job list display unit 31 displays a preview display screen 610 illustrated in FIG. 23C. The preview display screen 610 is a screen that displays a print image (preview) of a print job. The preview display screen 610 includes a preview window 611, a back button 612, a forward button 613, a current page 614, an OK button 615, a print button 616, a page designation button 617, a print settings button 631, and a delete button 632. The preview window 611 is a window for displaying an image for each page of the print job. The back button 612 is a button for displaying a preview of a page with a smaller page number, and the forward button 613 is a button for displaying a preview of a page with a larger page number. The current page 614 indicates the page number displayed in the preview window 611. The OK button 615 is a button for closing the preview display screen 610, and the print button 616 is a button for starting printing of the preview-displayed print job. The page designation button 617 is a button for designating and printing a page displayed in the preview window 611. The print settings button 631 is a button for displaying a print settings screen. The delete button 632 is a button for deleting a selected page.

When the OK button 615 is pressed, the print job display screen 500 is displayed again as illustrated in FIG. 24.

FIGS. 25A to 25D and FIG. 26 are diagrams illustrating screen transition when the print button 616 is pressed on the preview display screen 610. Screen transition when the print button 616 is pressed on the preview display screen 610 may be the same as when the print button 508 is pressed on the print job display screen 500. Therefore, FIGS. 25A to 25D and FIG. 26 may be the same as FIG. 21B, FIG. 21C and FIGS. 22A to 22C.

FIGS. 27A to 27B and FIGS. 28A to 28D are diagrams illustrating screen transition when a page is selected on the preview display screen 610 and the print button 616 is pressed. As illustrated in FIG. 27A, a check mark 618 is displayed on the page designation button 617. The check mark 618 is displayed when the user presses the page designation button 617 with a pointing device such as a mouse or a touch panel.

Screen transition when the print button 616 is pressed while the check mark 618 is displayed on the page designation button 617 may be the same as when the check mark 618 is not displayed. Therefore, FIG. 27B and FIGS. 28A to 28D may be the same as FIGS. 25A to 25D and FIG. 26.

Figure 29A:
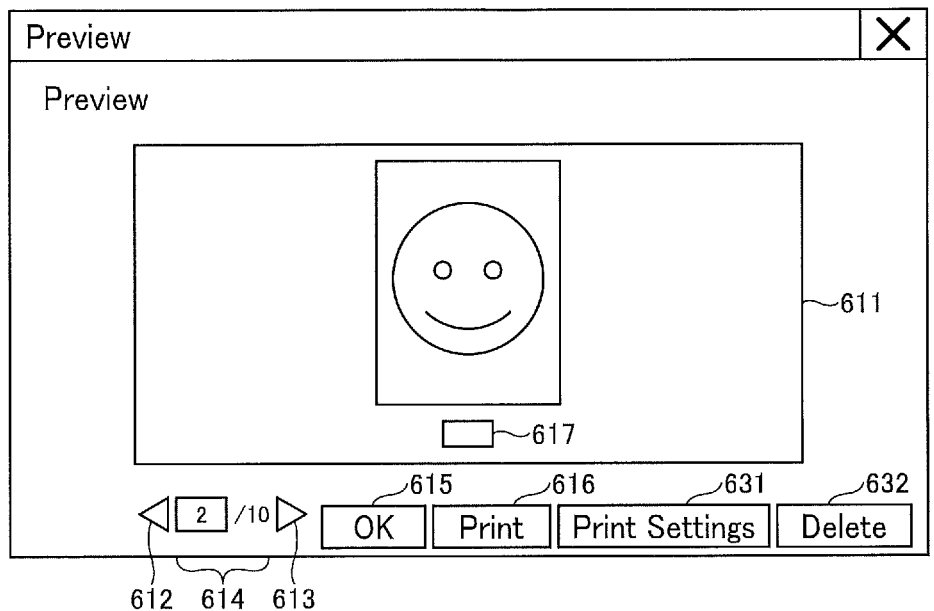
FIG. 29A and FIG. 29B are diagrams illustrating an example of screen transition when an edit button is pressed on an image forming apparatus selection screen.
Figure 29B:
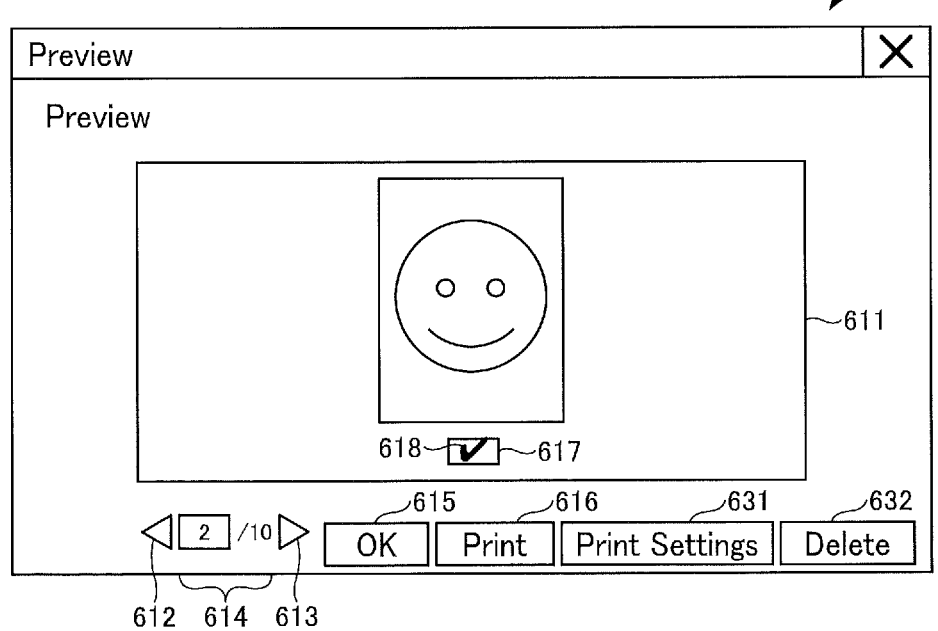

Screen transition when the edit button 563 is pressed on the image forming apparatus selection screen 560 of FIG. 21B is described with reference to FIGS. 29A to 29B and FIGS. 30A to 30D. When the user selects the image forming apparatus 70 on the image forming apparatus selection screen 560 and presses the edit button 563, a preview display screen is displayed as illustrated in FIG. 29A. As illustrated in FIG. 29B, the user can select and print a page by pressing a page designation button 617. The screen transition when the print button 616 is pressed on the preview display screen may be the same as when the check mark 618 is not displayed. Therefore, FIGS. 30A to 30D may be the same as FIGS. 25B to 25D and FIG. 26.

Figure 31A:
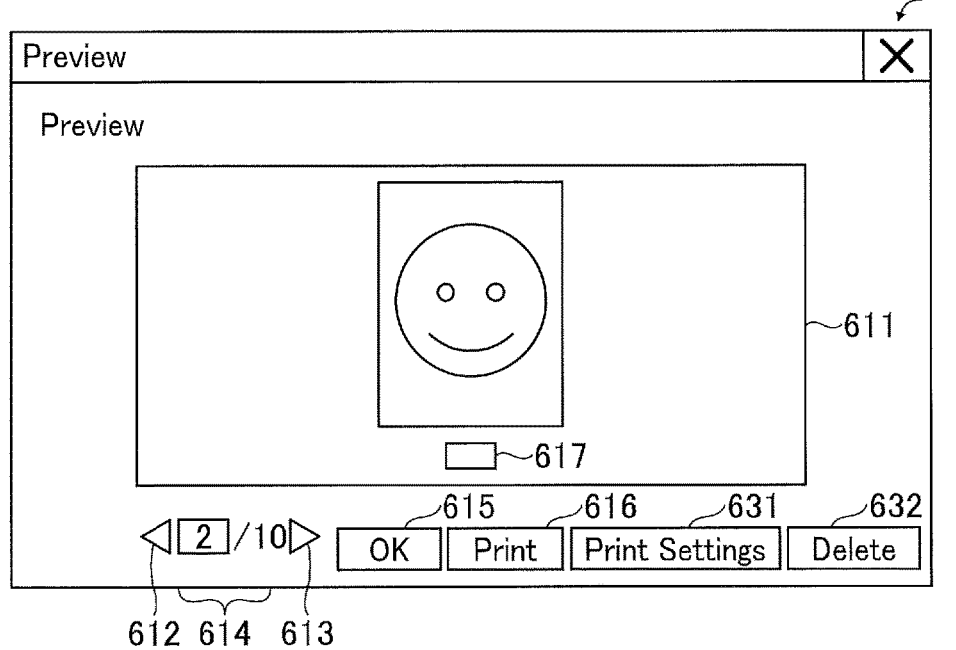
FIGS. 31A to 31D are diagrams illustrating an example of screen transition when a print settings button is pressed on the preview display screen.
Figure 31B:
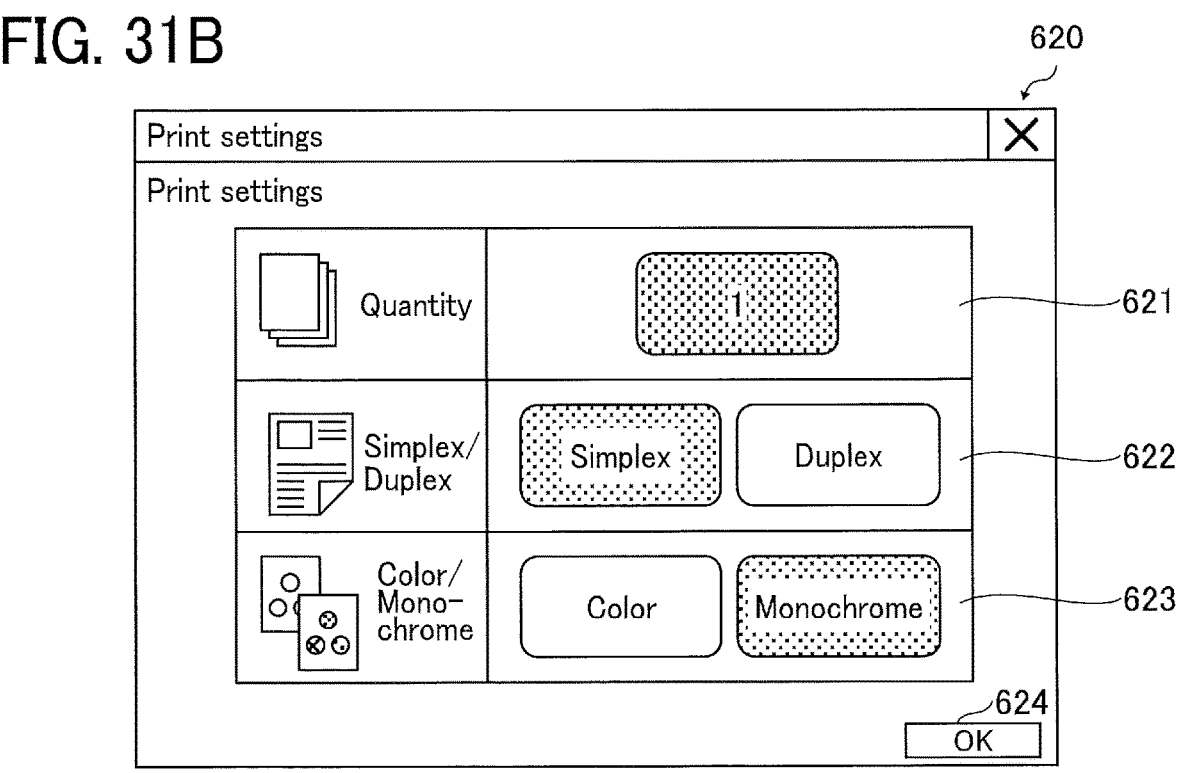

FIGS. 31A to 31D are diagrams illustrating screen transition when the print settings button 631 is pressed on the preview display screen 610. A preview display screen 610 is illustrated in FIG. 31A. When the print settings button 631 is pressed, a print settings screen 620 illustrated in FIG. 31B is displayed. The print settings screen 620 includes a print quantity setting field 621, a duplex or simplex setting field 622, a color or monochrome setting field 623, and an OK button 624. The shaded items in the print settings screen 620 illustrated in FIG. 31B are the items selected by the user on the touch panel. The print data editing unit 26 changes the print settings changed by the user.

Figure 31C:
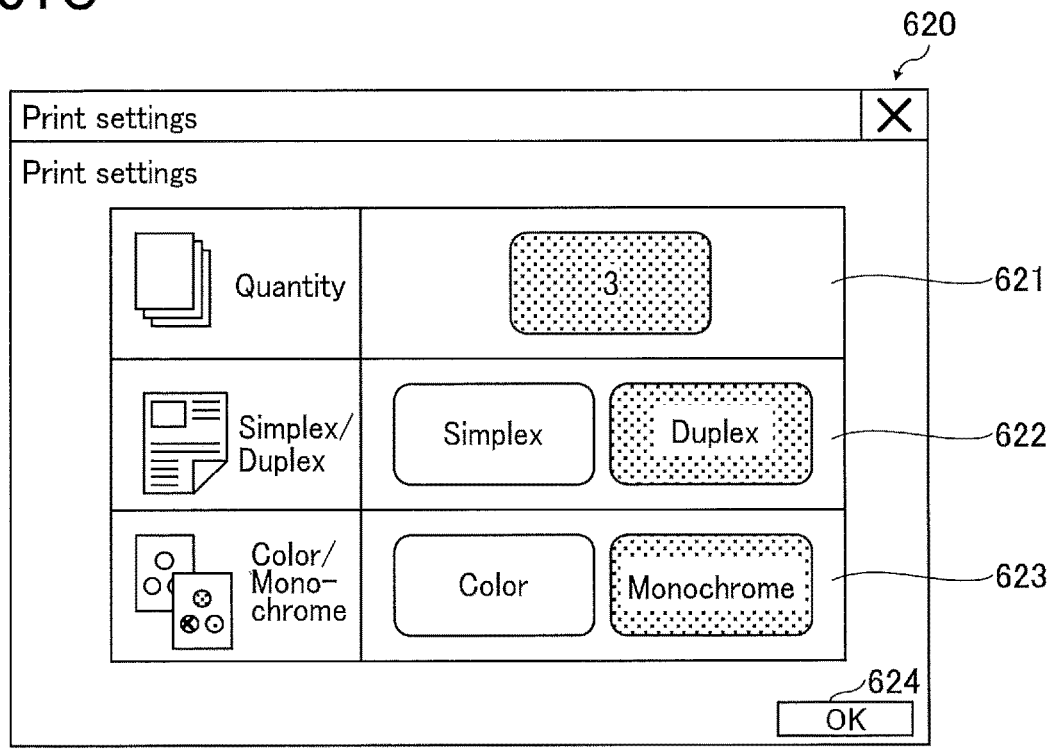

The print settings screen 620 after the user has changed the print settings is illustrated in FIG. 31C. Compared with the print settings screen 620 before user's setting illustrated in FIG. 31B, the selected (shaded) items are changed in the print settings screen 620 after settings are made by the user illustrated in FIG. 31C. As described above, the user can change the print settings from the preview display screen 610 displaying the stored print job.

Figure 31D:
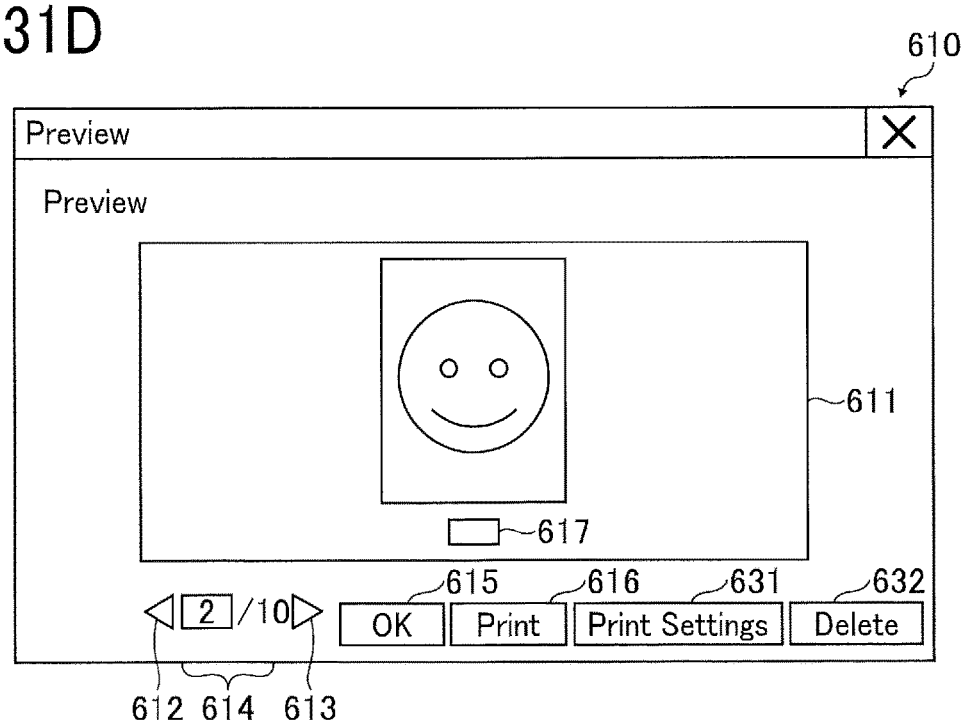

When the user presses the OK button 624, the screen returns to the preview display screen 610 as illustrated in FIG. 31D.

The screen transition for displaying the print settings screen 620 from the preview display screen 610 is possible when the preview button is pressed on the print job display screen 500, when a page is selected on the preview display screen 610 before the print button 616 is pressed, and when the preview display screen 610 in displayed by pressing the edit button on the image forming apparatus selection screen 560.

Figure 32A:
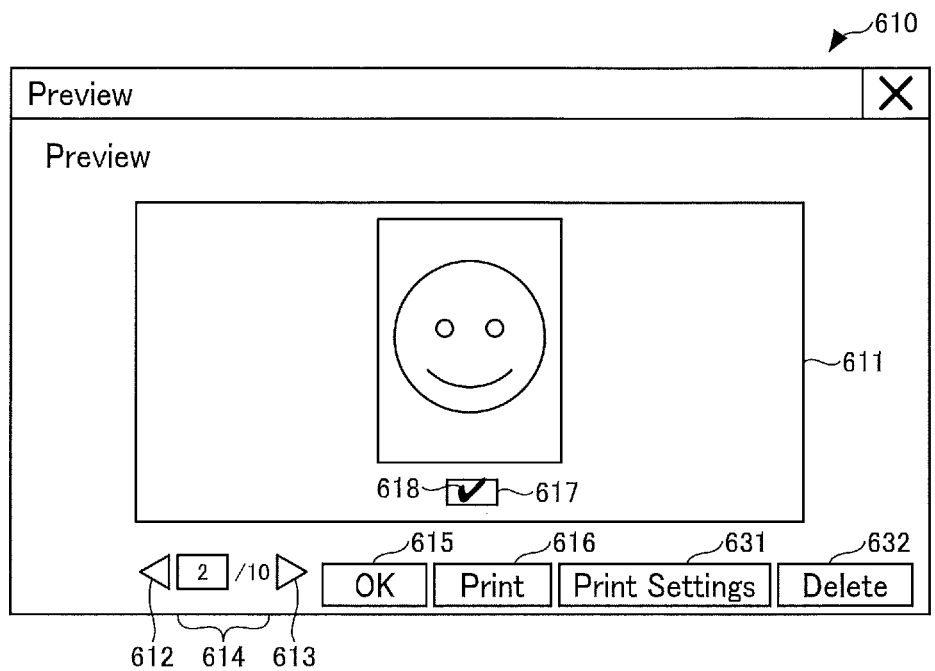
FIG. 32A and FIG. 32B are diagrams illustrating an example of screen transition when the delete button is pressed on the preview display screen.
Figure 32B:
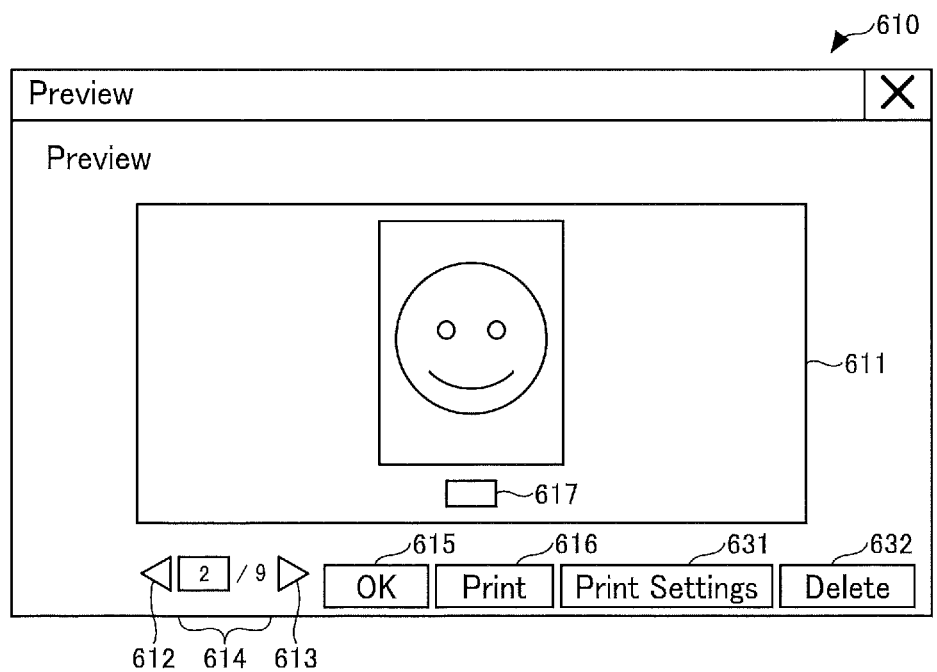

FIG. 32A and FIG. 32B are diagrams illustrating an example of screen transition when the delete button 632 is pressed on the preview display screen 610. As illustrated in FIG. 32A, the user sets a check mark 618 on a page to be deleted (not to be printed) on the preview display screen 610. When the user presses the delete button 632, the selected page is deleted from the print job. In the example of FIG. 32A and FIG. 32B, although the current number of pages 614 is "10" (FIG. 32A), the number changes to "9" in FIG. 32B since one page is deleted.

As described above, since the user U can operate the information processing apparatus 20 to execute the work related to the print job stored in the information processing apparatus 20, the user needs not to move to the image forming apparatus 70. Since the print data is held in the information processing apparatus 20 that has submitted the print job, by changing the print settings described in Page Description Language (PDL), settings such as duplex or simplex, color or monochrome, quantity (number of prints) can be changed, and any page can be deleted. Further, by using the image data in the print data, a preview can be displayed before printing is performed.

Although the image forming apparatus 70 can handle settings change such a as duplex or simplex, color or monochrome, number of prints, deletion of a page, etc., the image forming apparatus 70 is limited in the amount of memory that can be used, and is difficult in practice, or causes a large increase in cost. Since the information processing apparatus 20 has a much larger memory capacity than the image forming apparatus 70, various editing operations such as display of the preview display screen 610 and adjustment of print settings can be performed.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The apparatuses described in the examples are merely an illustration of one of several computing environments for implementing the embodiments disclosed herein. In some embodiments, management server 60 includes multiple computing devices, such as a server cluster. The plurality of computing devices are configured to communicate with one another through any type of communication link, including a network, shared memory, etc., and perform the processes disclosed herein. Similarly, proxy server 50 may include multiple computing devices configured to communicate with one another.

Note that the image forming apparatus 70 is not limited to an image forming apparatus as long as the apparatus has a communication function. The image forming apparatus 70 includes, for example, an output device such as a projector (PJ), an interactive white board (a white board having an electronic blackboard function capable of mutual communication (IWB)), a digital signage, a head up display (HUD) device, and an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC or a desktop PC.

For example, the configuration example of FIGS. 5A to 5D and the like is divided according to main functions in order to facilitate understanding of processing by the management server 60, the proxy server 50, the information processing apparatus 20, and the image forming apparatus 70. The present disclosure is not limited by the way of dividing the processing unit or the name. The processing of the management server 60, the proxy server 50, the information processing apparatus 20, and the image forming apparatus 70 can be divided into more processing units according to the processing content. Further, the processing unit may be divided so that one processing unit includes more processing. Each database need not be located in each apparatus but may be located anywhere accessible on the network.

Further, the functions of the management server 60 and the proxy server 50 may be distributed and arranged in a plurality of apparatuses to implement the functions of one management server 60 and the proxy server 50. Alternatively, a plurality of management servers 60 or a plurality of proxy servers 50 may be implemented.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. A print control method executed by an information processing apparatus communicably connected with an image forming apparatus, the method comprising:
    acquiring print data of a print job to be executed by the image forming apparatus, the print data being output from an application included in the information processing apparatus before the print data is spooled;
    editing the print data based on print settings included in the print job;
    storing the edited print data in a memory in association with identification information of the print job;
    receiving an operation for displaying a print job list;
    transmitting a user authentication request to a second information processing apparatus in response to receiving the operation for displaying the print job list;
    creating the print job list corresponding to the edited print data stored in the memory in response to receiving an indication of successful user authentication from the second information processing apparatus; and
    displaying the print job list on a display.

2. The print control method of claim 1, wherein
    the displaying displays a print job list display screen; and
    the print job list display screen includes the print job list and a display component for receiving an operation related to a print job selected from the print job list.

3. The print control method of claim 2, further comprising:
    wherein the display component is a print button for printing a selected print job; and
    when selection of a print job and pressing of the print button are received,
    causing the image forming apparatus to print the edited print data related to the selected print job stored in the memory.

4. The print control method of claim 2,
wherein the display component is a print button for printing a selected print job, and
when selection of a print job and pressing of the print button is received, the method further comprising:
displaying an image forming apparatus selection screen together with an edit button on the display, and
when pressing of the edit button is received, the method further comprising:
creating image data of the print data related to the selected print job stored in the memory;
displaying the image data on the display; and
receiving editing of the image data.

5. The print control method of claim 4, comprising:
wherein the display component is a print settings button for displaying print settings of a selected print job, and
when pressing of the print settings button is received,
displaying print settings of the selected print job and print settings for receiving settings change on the display; and
changing print settings of the selected print job when a setting change of at least one of duplex or simplex, color or monochrome, and number of prints is received.

6. The print control method of claim 1, further comprising:
wherein the display component is a delete button for deleting a selected print job, and
when selection of a print job and pressing of the delete button are received,
deleting the edited print data related to the selected print job stored in the memory.

7. The print control method of claim 1, further comprising:
wherein the display component is a preview button for displaying a preview of a selected print job, and
when selection of a print job and pressing of the preview button are received,
creating image data of the edited print data related to the selected print job stored in the memory; and
displaying the image data on the display.

8. The print control method of claim 7, further comprising:
displaying a print button on the display together with the image data; and
causing the image forming apparatus to print the edited print data corresponding to the image data on the display when pressing of the print button is received.

9. The print control method of claim 8, further comprising:
displaying a page designation button on the display together with the image data; and
causing the image forming apparatus to print only a page designated by the page designation button when pressing of the page designation button is received.

10. The print control method of claim 9, further comprising:
displaying a page designation button and a delete button together with the image data on the display; and
deleting only a page designated by the page designation button when pressing of the page designation button and pressing of the delete button are received.

11. A non-transitory recording medium storing a plurality of instructions which, when executed by one or more processors, cause the processors to perform a print control method comprising:
acquiring print data of a print job to be executed by an image forming apparatus, the print data being output from an application included in an information processing apparatus before the print data is spooled;
editing the print data based on print settings included in the print job;
storing the edited print data in a memory in association with identification information of the print job;
receiving an operation for displaying a print job list;
transmitting a user authentication request to a second information processing apparatus in response to receiving the operation for displaying the print job list;
creating the print job list corresponding to the print data stored in the memory in response to receiving an indication of successful user authentication from the second information processing apparatus; and
displaying the print job list on a display.

12. An information processing apparatus communicably connected to an image forming apparatus, the information processing apparatus comprising:
a memory that stores a plurality of instructions; and
a processor that executes the plurality of instructions, configured to:
acquire print data of a print job to be executed by the image forming apparatus, the print data being output from an application included in the information processing apparatus before the print data is spooled;
edit the print data based on print settings included in the print job;
store the edited print data in the memory in association with identification information of the print job;
receive an operation for displaying a print job list;
transmit a user authentication request to a second information processing apparatus in response to receiving the operation for displaying the print job list;
create the print job list corresponding to the print data stored in the memory in response to receiving an indication of successful user authentication from the second information processing apparatus; and
display the print job list on a display.

13. A printing system comprising:
the information processing apparatus of claim 12; and
an image forming apparatus;
wherein the processor of the information processing apparatus is further configured to:
cause the image forming apparatus to print the edited print data stored in the memory, when pressing of a print button for printing the print job corresponding to the edited print data is received; and
the image forming apparatus comprising:
a communication interface configured to receive the print job; and
a printer configured to print the print job.

* * * * *